(12) United States Patent
Miura

(10) Patent No.: US 12,468,166 B2
(45) Date of Patent: Nov. 11, 2025

(54) LIGHT-EMITTING DEVICE AND MANUFACTURING METHOD THEREFOR

(71) Applicant: NICHIA CORPORATION, Anan (JP)

(72) Inventor: Soichiro Miura, Tokushima (JP)

(73) Assignee: NICHIA CORPORATION, Anan (JP)

( * ) Notice: Subject to any disclaimer, the term of this patent is extended or adjusted under 35 U.S.C. 154(b) by 372 days.

(21) Appl. No.: 18/246,305

(22) PCT Filed: Aug. 25, 2021

(86) PCT No.: PCT/JP2021/031233
§ 371 (c)(1),
(2) Date: Mar. 22, 2023

(87) PCT Pub. No.: WO2022/064938
PCT Pub. Date: Mar. 31, 2022

(65) Prior Publication Data
US 2023/0359052 A1 Nov. 9, 2023

(30) Foreign Application Priority Data
Sep. 28, 2020 (JP) .................. 2020-162062

(51) Int. Cl.
*G02B 1/00* (2006.01)
*G02B 27/10* (2006.01)

(52) U.S. Cl.
CPC .................. *G02B 27/1006* (2013.01)

(58) Field of Classification Search
CPC ...... G02B 27/1006; H01S 5/0239; H01S 5/40
See application file for complete search history.

(56) References Cited

U.S. PATENT DOCUMENTS

| 4,659,185 A | 4/1987 | Aughton |
| 5,715,270 A | 2/1998 | Zediker et al. |

(Continued)

FOREIGN PATENT DOCUMENTS

| CN | 108233182 A | 6/2018 |
| EP | 0 325 361 A2 | 7/1989 |

(Continued)

OTHER PUBLICATIONS

International Search Report and Written Opinion of the International Searching Authority with English language translation of the International Search Report issued in the corresponding International Patent Application No. PCT/JP2021/031233, dated Nov. 9, 2021.

*Primary Examiner* — James C. Jones
(74) *Attorney, Agent, or Firm* — Foley & Lardner LLP

(57) ABSTRACT

A light-emitting device includes: a first light-emitting element to emit first light having a first peak wavelength; a second light-emitting element to emit second light having a second peak wavelength; and an optical control unit to receive the first light and second light having non-parallel optical axes and emit the first light and second light such that the first light and second light have parallel optical axes. The optical control unit includes: one or two first optical members which create a first region to reflect the first light at a first optical path length, a second region to reflect the first light at a second optical path length which emitting longer than the first optical path length, and a third region to transmit the first light and reflect the second light; and a second optical member having a reflective surface to reflect the second light.

19 Claims, 14 Drawing Sheets

(56) References Cited

U.S. PATENT DOCUMENTS

| | | |
|---|---|---|
| 2002/0090172 A1 | 7/2002 | Okazaki et al. |
| 2003/0234751 A1 | 12/2003 | Hwang |
| 2005/0231808 A1 | 10/2005 | Watson et al. |
| 2011/0096298 A1 | 4/2011 | Huang et al. |
| 2013/0021581 A1 | 1/2013 | Takahashi et al. |
| 2015/0168817 A1 | 6/2015 | Cobb et al. |
| 2023/0047415 A1* | 2/2023 | Adema ................ G02B 26/105 |

FOREIGN PATENT DOCUMENTS

| | | |
|---|---|---|
| EP | 0 416 927 A2 | 3/1991 |
| EP | 0 985 952 A1 | 3/2000 |
| JP | S59-224815 A | 12/1984 |
| JP | S64-018132 A | 1/1989 |
| JP | H01-237619 A | 9/1989 |
| JP | H03-096063 A | 9/1989 |
| JP | H08-140107 A | 5/1996 |
| JP | 2001-501777 A | 2/2001 |
| JP | 2002-204038 A | 7/2002 |
| JP | 2004-029784 A | 1/2004 |
| JP | 2006-128896 A | 5/2006 |
| JP | 2007-534987 A | 11/2007 |
| JP | 2017-502335 A | 1/2017 |
| WO | WO-99/49358 A1 | 9/1999 |
| WO | WO-2012/014798 A1 | 2/2012 |

\* cited by examiner

LIGHT-EMITTING DEVICE AND MANUFACTURING METHOD THEREFOR

TECHNICAL FIELD

The present disclosure relates to a light-emitting device and a manufacturing method therefor.

BACKGROUND ART

Patent Document 1 discloses a laser light source including a parallel-plate prism that combines laser beams that are emitted from a plurality of semiconductor laser devices.

CITATION LIST

Patent Literature
[Patent Document 1] Japanese Laid-Open Patent Publication No. 2002-204038

SUMMARY OF INVENTION

Technical Problem

There is a need to downsize light-emitting device that cause the optical axes of rays of light emitted from a plurality of light-emitting elements to become parallel before emitting them.

Solution to Problem

In one embodiment, a light-emitting device according to the present disclosure includes: a first light-emitting element to emit first light having a first peak wavelength; a second light-emitting element to emit second light having a second peak wavelength which is different from the first peak wavelength; and an optical control unit to receive the first light and second light having non-parallel optical axes and emit the first light and second light such that the first light and second light have parallel optical axes. The optical control unit includes: one or two first optical members which create a first region to reflect the first light at a first optical path length, a second region to reflect the first light at a second optical path length which is a longer optical path length than the first optical path length, and a third region to transmit the first light and reflect the second light; and a second optical member having a reflective surface to reflect the second light.

In one embodiment, a method of manufacturing a light-emitting device according to the present disclosure includes: disposing a first light-emitting element to emit first light having a first peak wavelength and a second light-emitting element to emit second light having a second peak wavelength which is different from the first peak wavelength; and disposing an optical control unit to receive the first light and second light having non-parallel optical axes and emit the first light and second light such that the first light and second light have parallel optical axes, wherein disposing the optical control unit includes: disposing one or two first optical members which create a first region to reflect the first light at a first optical path length, a second region to reflect the first light at a second optical path length which is a longer optical path length than the first optical path length, and a third region to transmit the first light and reflect the second light; and, after disposing the first optical member, disposing a second optical member having a reflective surface to reflect the second light.

Advantageous Effects of Invention

In accordance with a light-emitting device according to the present disclosure, it is possible to realize a downsized light-emitting device that causes the optical axes of rays of light emitted from a plurality of light-emitting elements to become parallel before emitting them.

DESCRIPTION OF EMBODIMENTS

Figure 1:
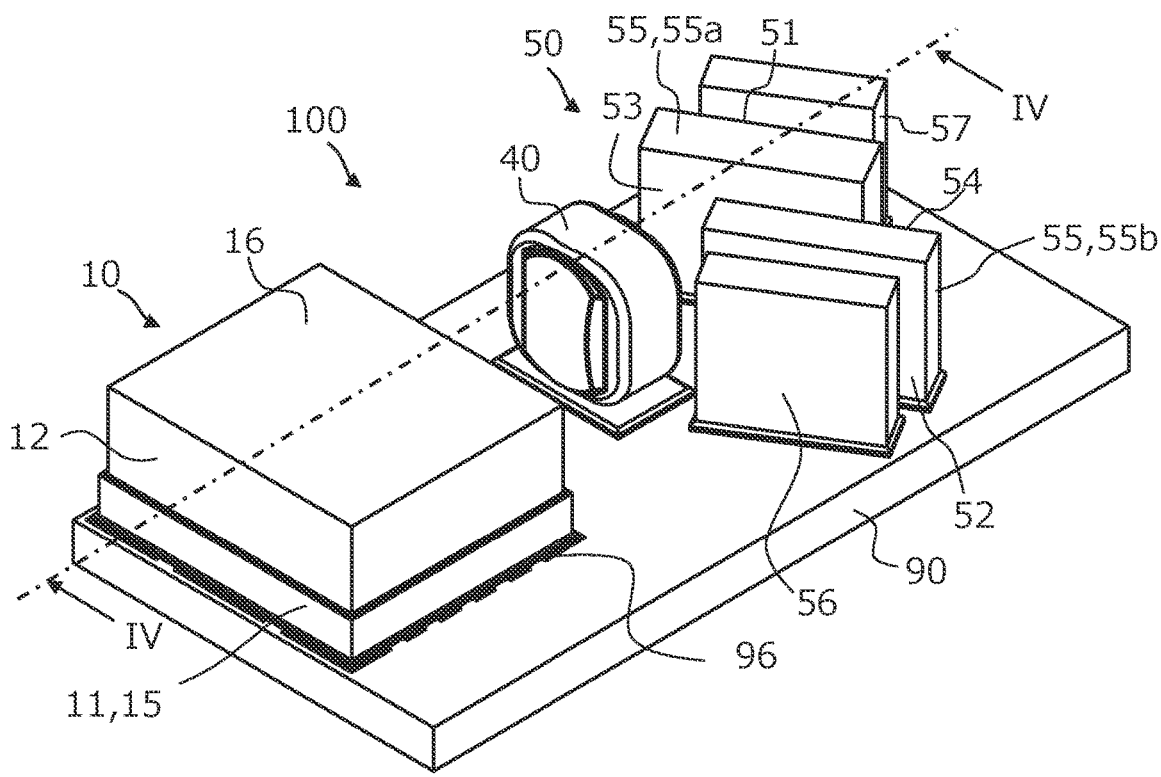
FIG. 1 is a perspective view of a light-emitting device according to a first embodiment.

In the present specification and in the claims, polygons such as triangles and quadrangles are not limited to polygons in the strict mathematical sense, but shall also include shapes in which a corner(s) of the polygon is/are rounded, beveled, chamfered, filleted, or otherwise modified. Not only in the case of corners (ends of a side(s)) of the polygon, but also in the case where a middle portion of a side(s) of the polygon is modified, the resulting shape shall also be referred to as a polygon. In other words, any shape that is partially modified while retaining the polygon as a base shall fall within the meaning of a "polygon" as described in the present specification and in the claims.

The same is true not only for polygons, but also for trapezoids, circles, concavities and convexities, and any other specific shape. The same is also true when referring to each side that forms the shape. In other words, even if a corner(s) or the middle portion of a side has been modified, the "side" is inclusive also of the modified portion(s). To distinguish a "polygon" or "side" that is not even locally modified from a modified version thereof, the word "strict" shall be applied, e.g., a "strict quadrangle".

In the present specification and in the claims, where there are a plurality of elements identified by a certain name and each element is to be expressed distinctly, each of the elements may be prefixed with "first", "second", and other ordinal numerals. For example, while a claim recites that "light-emitting elements are arranged on a substrate", it may be stated in the specification that "the first light-emitting element and the second light-emitting element are arranged on the substrate. The ordinal numerals "first" and "second" are merely used in order to distinguish between the two light-emitting elements. There is no special meaning attached to the order of these ordinal numerals. In some cases, the names of elements with the same ordinal numeral may actually refer to different elements between the specification and the claims. For example, if the specification describes elements identified by the terms "first light-emitting element", "second light-emitting element", "third light-emitting element", and so on, what is described as the "first light-emitting element" and the "second light-emitting element" in the claims may actually correspond to the "first light-emitting element" and the "third light-emitting element" in the specification. In the case where the term "first light-emitting element" is used but the term "second light-emitting element" does not appear in claim 1, the invention according to claim 1 only needs to have one light-emitting element, such that this one light-emitting element is not limited to the "first light-emitting element", but can be the "second light-emitting element" or the "third light-emitting element" as used in the specification.

In the present specification and in the claims, terms indicating specific directions or positions (e.g., "upper/above/over", "lower/below/under", "right", "left", "front", and "rear", or any other terms of which these are parts) may be used. These terms are merely being used to indicate relative directions or positions in the drawing under attention, in a manner that provides easy understanding. So long as the relative directions or positions as indicated by terms such as "upper/above/over", "lower/below/under", etc., in the drawing under attention are conserved, any drawing employed outside the present disclosure, actually manufactured products, production apparatuses, or the like may not adhere to the same exact positioning as that indicated in the drawing under attention.

Note that the dimensions, dimensional ratio, shapes, interspace of arrangement, etc. of any component elements shown in a drawing may be exaggerated for ease of understanding. In order to avoid excessive complexity of the drawings, certain elements may be omitted from illustration.

Hereinafter, with reference to the drawings, embodiment of the present invention will be described. Although the embodiments illustrate specific implementations of the technological concept of the present invention, they do not limit the present invention. The numerical values, shapes, materials, steps, and the order of the steps shown in the description of the embodiments are only examples, and various modifications are possible so long as there is no technical contradiction. In the following description, elements identified by the same name or reference numerals are the same or the same type of elements, and redundant explanations of those elements may be omitted.

First Embodiment

Figure 2:
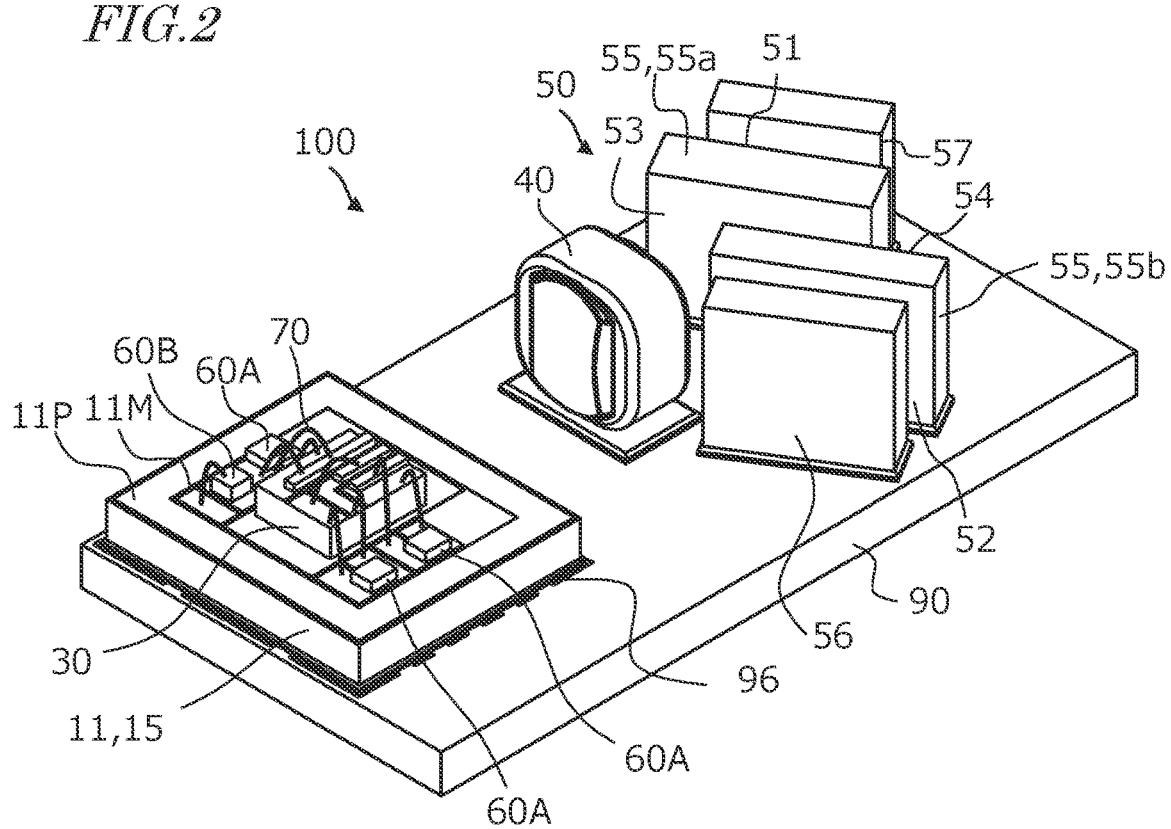
FIG. 2 is a perspective view of the light-emitting device according to the first embodiment, from which a cap of a package is omitted.
Figure 3:
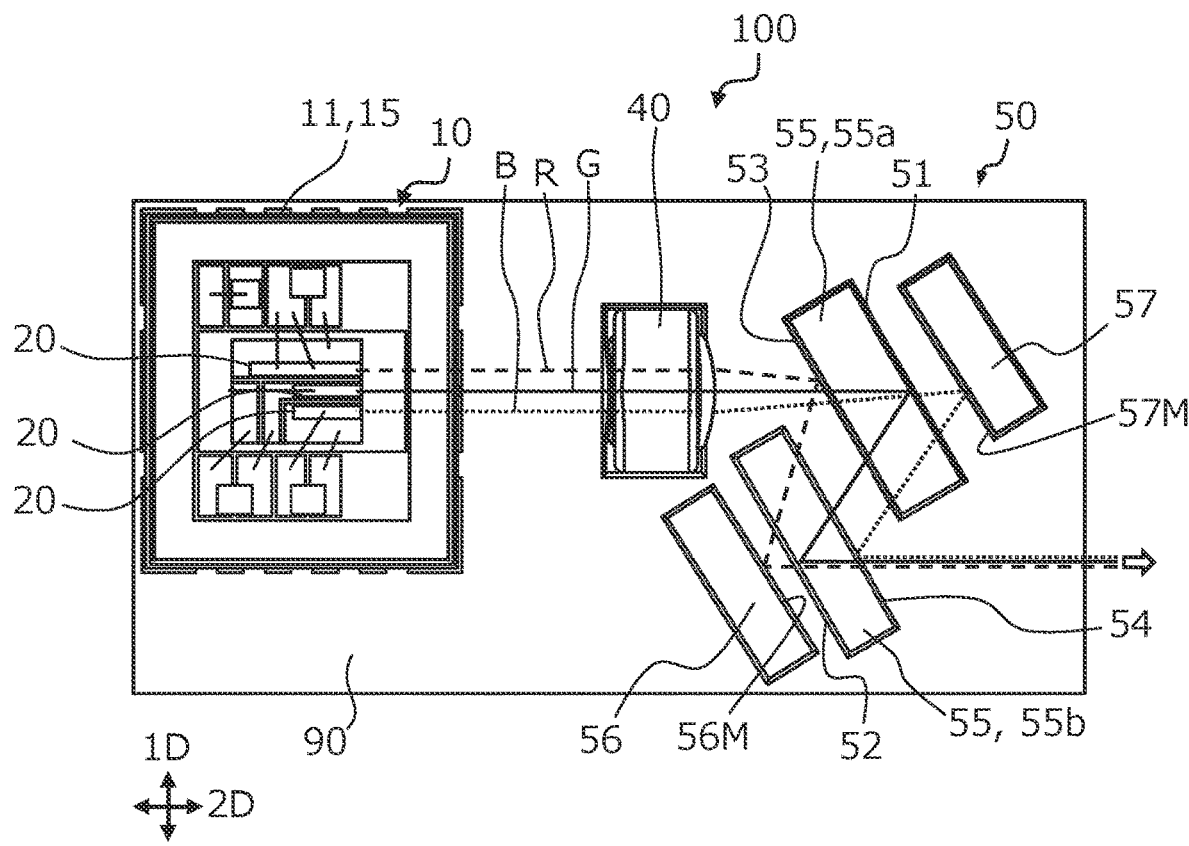
FIG. 3 is a top view of the light-emitting device according to the first embodiment, from which the cap of the package is omitted.
Figure 4:
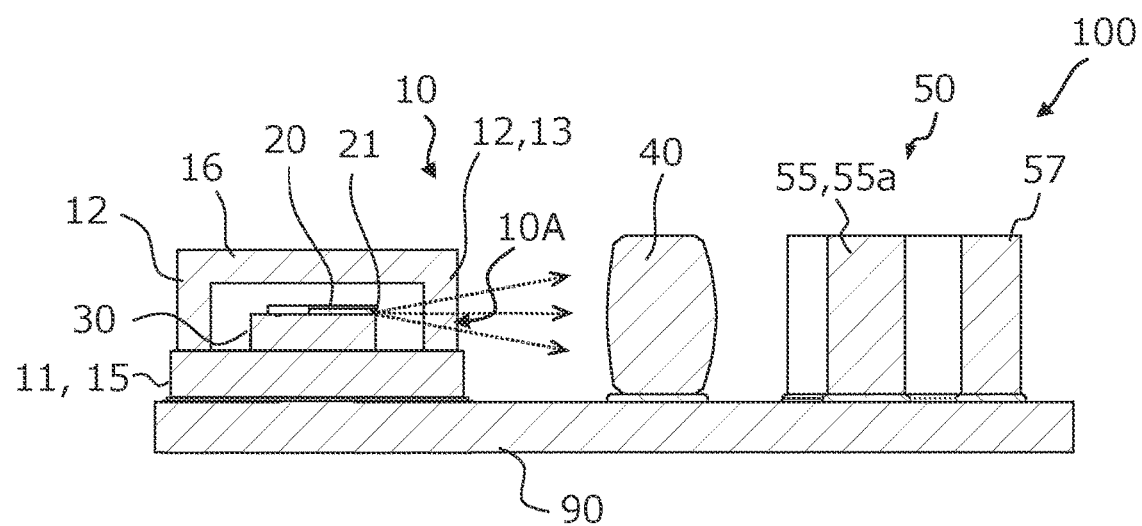
FIG. 4 is a cross-sectional view of the light-emitting device taken along cross-sectional line IV-IV in FIG. 1.
Figure 5:
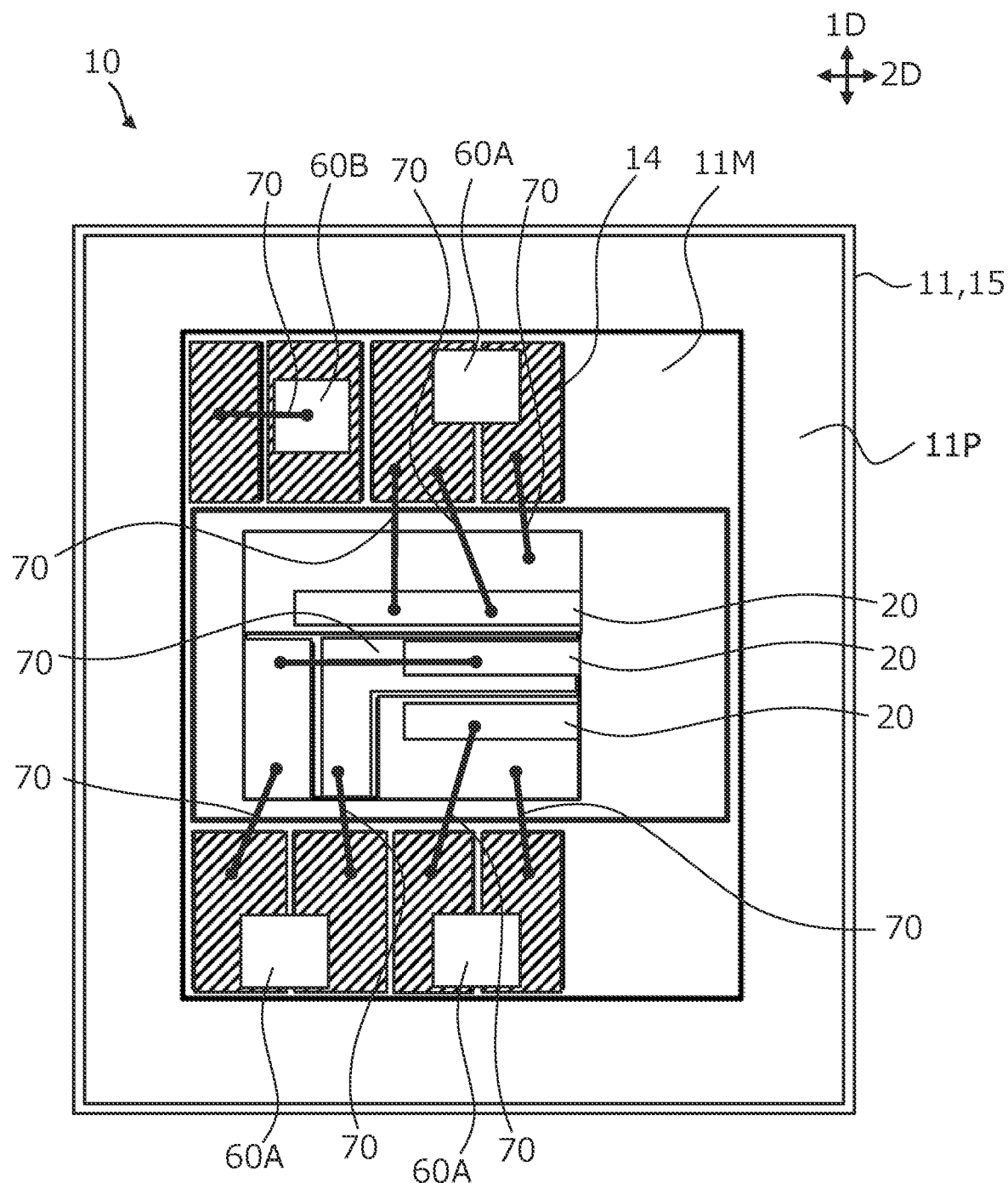
FIG. 5 is an enlarged top view of the inside of the package according to the first embodiment.
Figure 7:
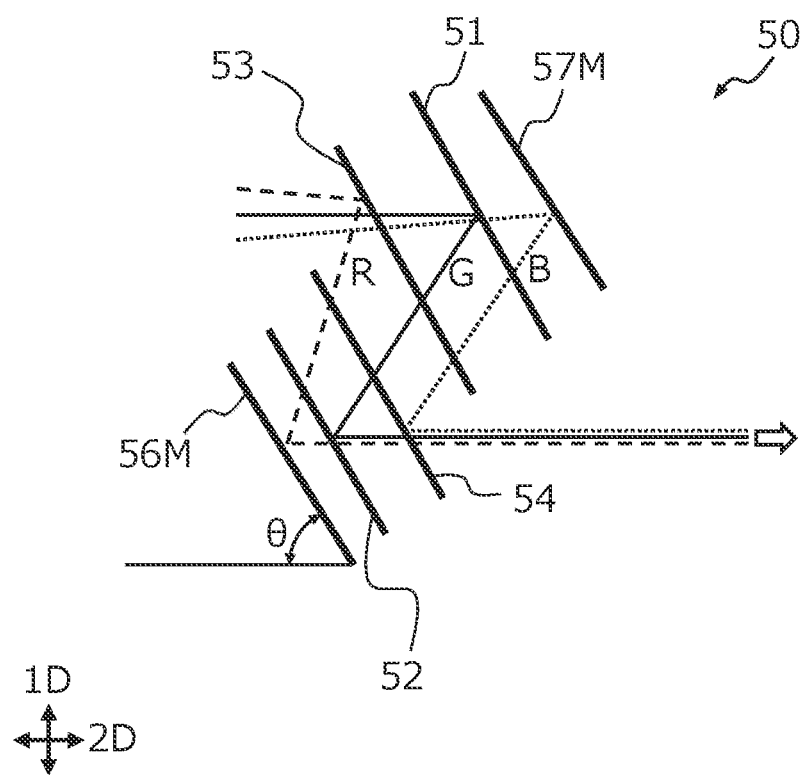
FIG. 7 is a diagram schematically showing transmission and reflection of light at reflective surfaces that are constituted by optical members of an optical control unit according to the first embodiment.
Figure 8:
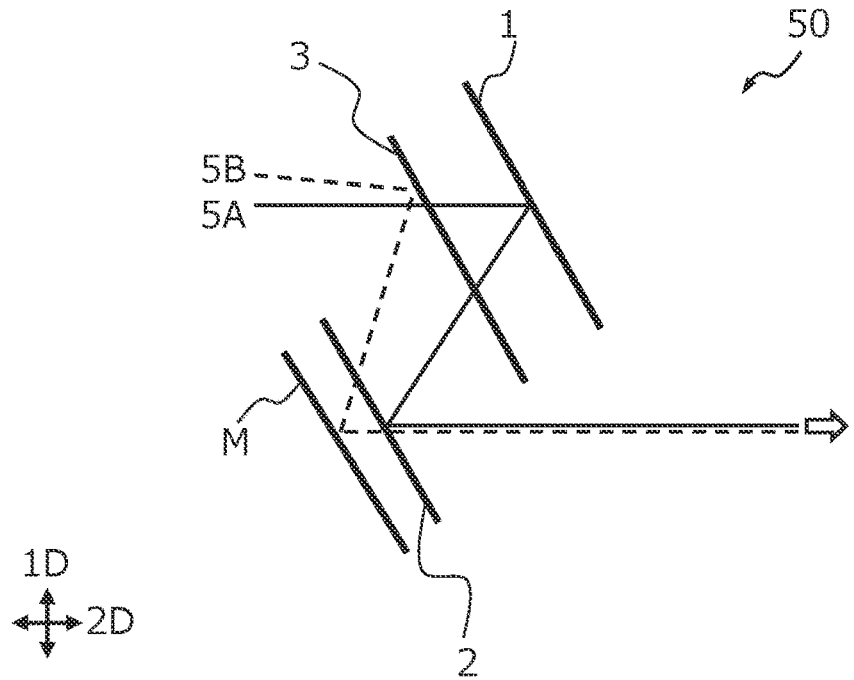
FIG. 8 is a diagram showing an example of transmission/reflection of first light and second light of different peak wavelengths in a modified example of an optical control unit according to the first embodiment.
Figure 9:
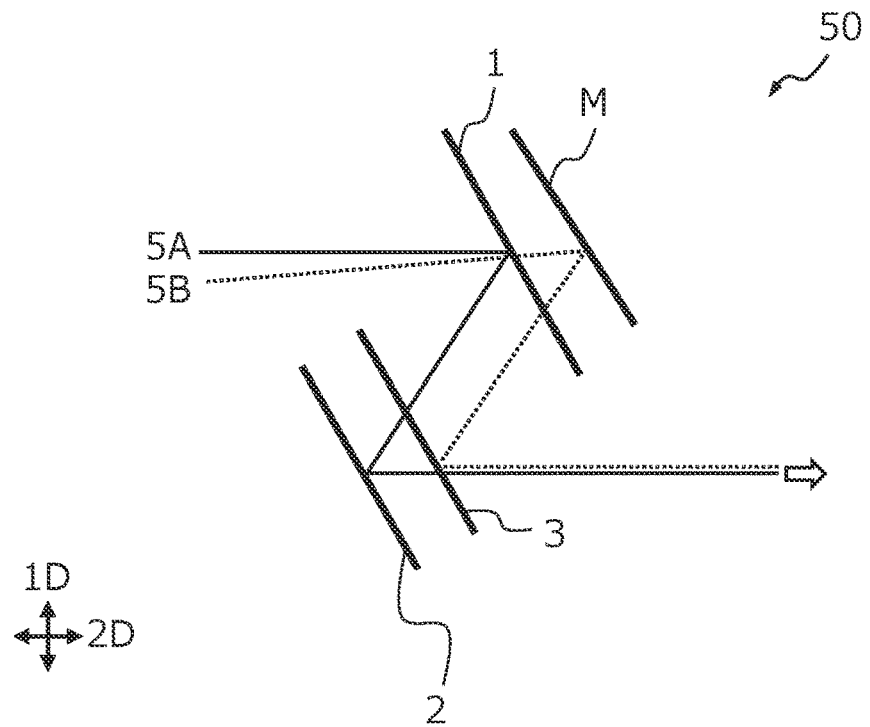
FIG. 9 is a diagram showing another example of transmission/reflection of first light and second light of different peak wavelengths in a modified example of an optical control unit according to the first embodiment.

A light-emitting device 100 according to a first embodiment will be described. FIGS. 1 to 9 are diagrams showing one example of the light-emitting device 100. FIG. 1 is a perspective view of the light-emitting device 100 according to the present embodiment. FIG. 2 is a perspective view of the light-emitting device 100, from which a cap 16 of a package 10 is omitted. FIG. 3 is a top view drawn in a similar manner to FIG. 2. FIG. 4 is a cross-sectional view taken along cross-sectional line IV-IV in FIG. 1. FIG. 5 is an enlarged top view of the inside of the package 10. FIG. 6A to FIG. 6D are graphs showing examples of reflectance characteristics of first to fourth regions, respectively, of an optical control unit according to the first embodiment. FIG. 7 is a diagram schematically showing transmission and reflection of light at reflective surfaces that are constituted by optical members of the optical control unit 50. FIG. 8 is a diagram showing an example of transmission/reflection of first light and second light of different peak wavelengths. FIG. 9 is a diagram showing another example of transmission/reflection of first light and second light of different peak wavelengths.

The light-emitting device 100 according to the present embodiment includes multiple component elements, including: the package 10, a plurality of light-emitting elements 20; one or more submounts 30; a lens member 40; optical control unit 50; one or more protection elements 60A; a temperature measurement element 60B; multiple interconnects 70; and a substrate 90.

In the illustrated example of the light-emitting device 100, the following are disposed within the space inside the package 10: three light-emitting elements 20, one submount 30, three protection elements 60A, one temperature measurement element 60B, and multiple interconnects 70. Light which is emitted from each of the three light-emitting elements 20 is emitted from the package 10 to the outside, and thereafter is collimated by the lens member 40. The light rays having been emitted from the lens member 40 is incident on the optical control unit 50 in such a manner that their optical axes are not parallel to one another. Light rays whose optical axes are parallel to one another are emitted from the optical control unit 50.

First, each component element will be described.
(Package 10)

The package 10 includes: a base portion 11, which includes a mounting surface 11M; and a lateral wall section 12. In a top view, the package 10 has a rectangular outer shape. The outer shape of the package 10 does not need to be a rectangle, but may be any polygon other than a quadrangle, a circle, etc., for example.

The mounting surface 11M is a plane, on which one or more component elements of the light-emitting device 100 are disposed. The lateral wall section 12, surrounding the mounting surface 11M, extends upward from the mounting surface 11M. The one or more component elements disposed on the mounting surface 11M are surrounded by the lateral wall section 12. The package 10 further includes an upper face section. The upper face section connects to the lateral wall section 12, upward from the mounting surface 11M. The upper face section is situated immediately above the one or more component elements disposed on the mounting surface 11M.

The package 10 includes multiple wiring regions 14 for achieving electrical connection. The multiple wiring regions 14 are provided on the mounting surface 11M. In FIG. 5, all wiring region 14 are similarly hatched, rather than being given a numeral to each. Through via holes extending inside the base portion 11, the multiple wiring regions 14 may be electrically connected to wiring regions that are provided on a lower face (i.e., the opposite surface to the mounting surface 11M) of the base portion 11. Such wiring regions to be electrically connected to the wiring regions 14 may be provided on any other external surface (the upper face or an outer side face) of the package 10, without being limited to the lower face of the base portion 11.

The package 10 includes a light extraction surface 10A. The light extraction surface 10A may be a selected one of the one or more outer side faces constituting the lateral wall section 12. The light extraction surface 10A is perpendicular to a plane that is parallel to the mounting surface 11M. As used herein, being "perpendicular" admits of a difference within ±5 degrees. The light extraction surface 10A may be inclined from the plane that is parallel to the mounting surface 11M.

At least a partial region of the light extraction surface 10A is light-transmissive. This light-transmitting region will be referred to as a light-transmissive region 13 (see FIG. 4 for the numeral "13"). When it is said that a region is of "light-transmissive" nature, it is meant that a main portion of light entering the region enjoys a transmittance of 80% or more. The light-transmissive region 13 may extend astride a plurality of outer side faces of the package 10.

Note that the light-transmissive region 13 may not be the only light-transmissive region of the package 10. For example, another light-transmissive region(s) may be provided, apart from the light-transmissive region 13, on a surface other than the light extraction surface 10A. The package 10 may include any non-light-transmissive regions (i.e., a region(s) which are not of light-transmissive nature).

In the illustrated example of the package 10, only one of the outer side faces constituting the lateral wall section 12 is the light extraction surface 10A. The package 10 includes four outer side faces corresponding to the rectangular outer shape, all of these four faces being light-transmissive.

The package 10 may be composed of a substrate 15 and a cap 16 fixed to the substrate 15. The package 10 may also include any additional component elements. The substrate 15 includes the base portion 11, whereas the cap 16 includes the lateral wall section 12 and the upper face section. The substrate 15 is plate-shaped. The cap 16 has a dented, concave shape. The outer shape of the cap 16 is rectangular in a top view. The outer shape of the cap 16 does not need to be rectangular; for example, it may be any polygon other than a quadrangle, a circle, etc., for example.

As the cap 16 is bonded to the substrate 15, an internal space is created in the package 10. A peripheral region 11P is provided on the mounting surface 11M of the substrate 15. The peripheral region 11P is provided around a region of the mounting surface 11M where other component elements are disposed. The peripheral region 11P are provided around the multiple wiring regions 14. The cap 16 is bonded to the peripheral region 11P of the substrate 15. A metal film for bonding may be disposed in the peripheral region 11P. The internal space of the package 10 becomes a sealed space. The internal space of the package 10 is in a hermetically sealed state.

The cap 16 may be made of a light-transmissive material, for example. Only the lateral wall section 12 of the cap 16 may be made of a light-transmissive material; for example, the upper face section may be made of a non-light-transmissive material.

The substrate 15 may be made of a ceramic as a main material. Examples of ceramics to be serve as the main material of the substrate 15 include aluminum nitride, silicon nitride, aluminum oxide, and silicon carbide. The substrate 15 may be made of a ceramic substrate that has multiple metal vias inside. The wiring regions 14 may be a patterned metal film that is made of an electrical conductor, e.g., a metal.

The cap 16 may be produced from a light-transmissive material such as glass, plastic, or quartz, by using a processing technique such as molding or etching. The cap 16 may be formed by first forming the upper face section and the lateral wall section 12 by using different materials as their main materials, and bonding them together. For example, the main material of the upper face section may be monocrystalline or polycrystalline silicon, while the main material of the lateral wall section may be glass.

Note that the internal space of the package 10 may be made by any method other than by using a plate-shaped member having the mounting surface 11M and a concave-shaped member, e.g., the substrate 15 and the cap 16. For example, the internal space of the package 10 may be formed of a concave-shaped member having the mounting surface 11M and a plate-shaped member. Alternatively, for example, the internal space of the package 10 may be formed of two concave-shaped members, one of which has the mounting surface 11M.

Hereinafter, in order to distinguish the substrate 15 and the substrate 90 from each other, they may be respectively referred to as the first substrate 15 and the second substrate 90.

(Light-Emitting Element 20)

An example of a light-emitting element 20 is a semiconductor laser device. The light-emitting element 20 may have a rectangular outer shape in a top view. In the case where the light-emitting element 20 is an edge-emitting type semiconductor laser device, a side face that intersects one of the two shorter sides of the rectangle defines an emission end face through which light is emitted (light-emitting surface 21). In this example, an upper face and a lower face of the light-emitting element 20 each have a greater area than that of the light-emitting surface 21. Without being limited to an edge-emitting type semiconductor laser device, the light-emitting element 20 may be a semiconductor laser device of a surface emitting type, or a light-emitting diode (LED). In the illustrated example of the light-emitting device 100, an edge-emitting type semiconductor laser device is adopted as the light-emitting element 20.

The light-emitting element 20 is a single-emitter device (i.e., having one emitter), for example. Note that the light-emitting element 20 may be a multi-emitter device (i.e., having two or more emitters). In the case where the light-emitting element 20 is a semiconductor laser device having multiple emitters, one common electrode may be provided on one of the upper face and the lower face of the light-emitting element 20, and electrodes corresponding to the respective emitters may be provided on the other one of the upper face and the lower face.

The light which is emitted from the light-emitting surface 21 of the light-emitting element 20 is divergent light having some spread. Alternatively, the light may not be divergent light. In the case where the light-emitting element 20 is a semiconductor laser device, the divergent light (laser light) that is emitted from the semiconductor laser device creates a far field pattern (hereinafter referred to as "FFP") of an elliptical shape at a face that is parallel to the light-emitting surface. An FFP refers to the shape, or optical intensity distribution, of outgoing light at a position away from the light-emitting surface.

Light which passes through the center of the elliptical shape of an FFP, i.e., light having a peak intensity in the optical intensity distribution of the FFP, will be referred to as "light traveling on an optical axis". Moreover, the optical path of light traveling on an optical axis will be referred to as "the optical axis" of that light. In the optical intensity distribution of an FFP, light having an intensity which is $1/e^2$ or greater with respect to the peak intensity value may be referred to as the "main portion" of light.

In the elliptical shape of an FFP of light that is emitted from the light-emitting element 20 being a semiconductor laser device, the minor axis direction of the ellipse will be referred to the "slow-axis direction", and its major axis direction will be referred to as the "fast-axis direction". The plurality of layers that compose the semiconductor laser device (including an active layer) are layered in the fast-axis direction.

Based on the optical intensity distribution of an FFP, an angle corresponding to an intensity which is $1/e^2$ with respect to the peak intensity value of the optical intensity distribution is defined as an angle of spread of the light from the semiconductor laser device. An angle of spread of light along the fast-axis direction may be referred to as an "angle of spread along the vertical direction", whereas an angle of spread of light along the slow-axis direction may be referred to as an "angle of spread along the horizontal direction".

As the light-emitting element 20, for example, a semiconductor laser device emitting blue light, a semiconductor laser device emitting green light, a semiconductor laser device emitting red light, or the like may be adopted. Semiconductor laser devices emitting any other colors of light may also be adopted.

Herein, blue light refers to light which falls within an emission peak wavelength range from 420 nm to 494 nm. Green light refers to light which falls within an emission peak wavelength range from 495 nm to 570 nm. Red light refers to light which falls within an emission peak wavelength range from 605 nm to 750 nm.

Examples of semiconductor laser device emitting blue light or semiconductor laser devices emitting green light may be semiconductor laser devices containing a nitride semiconductor. As the nitride semiconductor, for example, GaN, InGaN, or AlGaN may be used. Examples of semiconductor laser devices emitting red light may be those containing an InAlGaP-based, GaInP-based, GaAs-based, or AlGaAs-based semiconductor.

(Submount 30)

The submount 30 has two bonding surfaces, and is shaped as a rectangular solid. At the opposite side to one bonding surface, the other bonding surface is provided. The distance between these two bonding surfaces is shorter than the distance between any other pair of two opposing surfaces. The shape of the submount 30 is not limited to a rectangular solid. The submount 30 may be made of aluminum nitride or silicon carbide. A metal film for bonding purposes is provided on the bonding surface.

(Lens Member 40)

The lens member 40 is formed so as to have one or more lens surfaces. The lens member 40 collimates light incident thereon. For example, the one or more lens surfaces may be designed so as receive light that diverges from the focal point, convert the divergent light into collimated light through refraction, and emit it through the lens member 40. Each lens surface may be spherical or aspherical. A lens surface(s) may be formed on the surface at the light-incident side of the lens member 40 and/or the surface at the light-emitting side of the lens member 40. Optical films, such as antireflection coating or protective coating, may be formed on the surface at the light-incident side of the lens member 40 and/or the surface at the light-emitting side of the lens member 40. In the illustrated example of the lens member 40, a concave lens surface is formed on the light-incident side, and a convex lens surface is formed on the light-emitting side. Note that a plurality of lens surfaces may be formed on the surface at the light-incident side; that is, one or more lens surfaces may be formed on the surface at the light-incident side of the lens member 40. Note that a plurality of lens surfaces may be formed on the surface at the light-emitting side; that is, one or more lens surfaces may be formed on the surface at the light-emitting side of the lens member 40.

The lens member 40 may be made of a light-transmissive material, e.g., glass or plastic. Although the portion of the lens member 40 through which light is not transmitted may have any arbitrary shape, it preferably has a shape that allows the lens member 40 to be fixed to other component elements. In the illustrated example of the lens member 40, when its optical axis is disposed so as to extend in parallel to the lower face of the lens member 40, the lens member 40 has a flat lower face, such that this lower face may function as a bonding surface.

(Optical Control Unit 50)

The optical control unit 50 controls a plurality of rays of light so that a plurality of rays of light having non-parallel optical axes become a plurality of rays of light having parallel optical axes. The optical control unit 50 includes a plurality of optical members. With the plurality of optical members, the optical control unit 50 performs an optical control that combines selective reflection and selective transmission to align their optical axes so as to be parallel. Furthermore, it converts a plurality of rays of light into coaxial light before they are emitted.

Each of the plurality of optical members is plate-shaped. However, it does not need to be plate-shaped. The plurality of optical members include one or two first optical members. The first optical member(s) have properties such that they at least transmit light in a predetermined wavelength range. The plurality of optical members include a second optical member 56 or a third optical member 57. The second optical member 56 or third optical member 57 has properties such that they at least reflect light in a predetermined wavelength range.

In the illustrated example of the light-emitting device, the optical control unit 50 includes two first optical members 55a and 55b, a second optical member 56, and a third optical member 57. Note that the number of first optical members does not need to be two, but only one "first optical member" may be incorporated; therefore, the one or two "first optical member(s)" may, as a whole, be collectively referred to as the first optical member(s) 55.

The plurality of rays of light incident on the optical control unit 50 are light of respectively different peak wavelengths. Alternatively, the plurality of rays of light incident on the optical control unit 50 may be light of respectively different colors. With the plurality of optical members, a plurality of regions (optical control regions) for performing selective optical control for the plurality of rays of light are created.

The first optical member 55 creates multiple optical control regions to perform optical control. The optical control by the first optical member 55 is selectively performed for a plurality of rays of light. For example, an optical control may be performed such that one of the plurality of rays of light is reflected but another is transmitted.

The second optical member 56 creates one or more optical control regions to perform optical control. The optical control by the second optical member 56 is selectively performed for at least one ray of light. The third optical member 57 creates one or more optical control regions to perform optical control. The optical control by the third optical member 57 is selectively performed for at least one ray of light.

Each optical control region may be formed on the surface (a preferably flat and smooth surface) of an optical member. For example, an optical member that is made of a transparent material (e.g., a glass or a plastic) that transmits visible light may be formed on the surface (principal face) of a transparent main body, by depositing a multilayer dielectric film with a thin-film deposition technique such as sputtering. Each optical member 55 may be implemented as a dichroic mirror, for example.

(Protection Element 60A)

The protection elements 60A are circuit elements to prevent certain devices (e.g., a light-emitting element 20) from being destroyed by an excessive current flowing into it. A typical example of a protection element 60A is a voltage regulating diode such as a Zener diode. As a Zener diode, an Si diode may be adopted.

(Temperature Measurement Element 60B)

The temperature measurement element 60B is a device used as a temperature sensor for measuring the surrounding temperature. As the temperature measurement element 60B, a thermistor may be used, for example.

(Interconnect 70)

Each interconnect 70 is made of an electrical conductor having a linear shape, both ends of which serve as bonding sites. In other words, the interconnect 70 has, at both ends of its linear body, bonding sites for bonding to other component elements. The interconnect 70 may be a metal wire, for example. Examples of metals include gold, aluminum, silver, and copper.

(Second Substrate 90)

The second substrate 90 includes multiple wiring regions. The wiring regions of the second substrate extend inside the second substrate 90, so as to be electrically connected to wiring regions provided on the lower face of the second substrate 90. Without being limited to the lower face of the second substrate 90, the wiring regions to be electrically connected to the wiring regions disposed on the upper face of the second substrate 90 may be provided on any other external surface (e.g., an upper face or outer side faces) of the second substrate 90.

The second substrate 90 can be formed by using a ceramic as a main material. Examples of ceramics to be used for the second substrate 90 include aluminum nitride, silicon nitride, aluminum oxide, and silicon carbide.

The second substrate 90 preferably includes a portion that is made of a material which is superior in heat-releasing ability to ceramics (i.e., a material of high thermal conductivity). In the exemplary second substrate 90, the second substrate 90 may include a heat-conductive member embedded inside. Such a heat-conductive member fills an opening penetrating from the upper face to the lower face of the second substrate 90. The heat-conductive member may be provided in a region opposed to the lower face of the first substrate 15. The heat-conductive member may be made of a material of high thermal conductivity mentioned above. The heat-conductive member may have any arbitrary shape.

The second substrate 90 is structured so as to support the component elements of the light-emitting device 100, and to be capable of electrically connecting with electronic parts included in such component elements. The second substrate 90 may also support any elements, electronic parts, or optical parts other than the component elements of the light-emitting device 100.

(Light-Emitting Device 100)

Next, the light-emitting device 100 will be described.

In the light-emitting device 100, the plurality of light-emitting elements 20 are disposed in the internal space of the package 10. For example, by hermetically sealing the internal space of the package 10, deteriorations in quality due to collection of dust in the light-emitting element 20 can be restrained. Such a sealing structure is preferable in the case where the light-emitting element 20 is a semiconductor laser device, for example. Note that the light-emitting element 20 does not need to be in a sealed internal space.

The plurality of light-emitting elements 20 are disposed on the mounting surface 11M. The plurality of light-emitting elements 20 emit light toward the lateral wall section 12. The plurality of light-emitting elements 20 emit light of respectively different peak wavelengths. The plurality of light-emitting elements 20 emit light of respectively different colors. The rays of light emitted from the light-emitting surfaces 21 of the plurality of light-emitting elements 20 are each emitted from the light-transmissive region 13 of the light extraction surface 10A.

The plurality of light-emitting elements 20 are arranged so that the light-emitting surface 21 face the light extraction surface 10A. The plurality of light-emitting elements 20 are arranged so that the light-emitting surfaces 21 are parallel. The direction in which the plurality of light-emitting elements 20 are arranged will be referred to as the first direction.

The light traveling on the optical axis, emitted from the plurality of light-emitting elements 20, travels from the light-emitting surface 21 in a parallel direction to the mounting surface 11M. The light traveling on the optical axis, emitted from the plurality of light-emitting elements 20, travels from the light extraction surface 10A in a parallel direction to the mounting surface 11M. As used herein, being parallel admits of a difference within ±3 degrees. The direction in which the light traveling on the optical axis emitted from the light-emitting element 20 travels from the light extraction surface 10A will be referred to as the second direction.

The light extraction surface 10A is perpendicular to the second direction of the light traveling on the optical axis emitted from at least one light-emitting element 20. Note that the light extraction surface 10A does not need to be perpendicular to the optical axis.

In the illustrated example of the light-emitting device 100, the first direction coincides with the direction of arrows 1D shown in the figures (hereinafter referred to as the 1D direction). The second direction of any one of the plurality of light-emitting elements 20 coincides with the direction of arrows 2D shown in the figures (hereinafter referred to as the 2D direction). In a top view, the light extraction surface 10A is parallel to the 1D direction.

In the illustrated example of the light-emitting device 100, the plurality of light-emitting elements 20 consist of composed of three semiconductor laser devices. Herein, the light emitted from the three light-emitting elements 20 will respectively be referred to as first light, second light, and third light. Moreover, peak wavelengths of the first light, the second light, and the third light will be referred to as the first peak wavelength, the second peak wavelength, and the third peak wavelength, respectively. The first light, the second light, and the third light are light of respectively different colors selected from among red light, green light, and blue light. Among the three light-emitting elements 20 arranged along the first direction, the light-emitting element 20 disposed in the middle radiates green first light, whereas the two light-emitting elements 20 flanking this light-emitting element 20 respectively radiate red second light and blue third light. An implementation in which the three light-emitting elements 20 are composed of light of the three colors of RGB may be adopted for applications of color image displaying, for example. Note that the colors of light to be emitted from the respective light-emitting elements 20 are not limited to these, and are not limited to visible light. In the figure, the optical path of first light travelling along the optical axis is depicted with a solid line; the optical path of second light travelling along the optical axis is depicted with a broken line; and the optical path of third light travelling along the optical axis is depicted with a dotted line. Also, the first light is denoted as "G", the second light "R", and the third light "B".

The light-emitting device 100 includes a plurality of light-emitting elements 20 being disposed on one or more submounts 30. The submount(s) 30 is bonded to the light-emitting elements 20 at one of its bonding surface, and is bonded to the mounting surface 11M at its opposite bonding surface. In the illustrated example of the light-emitting device 100, a plurality of light-emitting elements 20 are disposed on a single submount 30. Note that the plurality of light-emitting elements 20 may be disposed directly on the mounting surface 11M, rather than via a submount 30.

In the light-emitting device 100, the one or more protection elements 60A are disposed inside the package 10. Each protection element 60A is disposed on the mounting surface 11M. Different protection elements 60A are to be disposed in different wiring regions 14. The light-emitting elements 20 are protected by the protection elements 60A. In the illustrated example of the light-emitting device 100, a plurality of protection elements 60A are provided in a one-to-one relationship for a plurality of light-emitting elements 20.

In the light-emitting device 100, the temperature measurement element 60B is disposed inside the package 10. The temperature measurement element 60B is disposed on the mounting surface 11M. The temperature measurement element 60B is disposed in a wiring region 14 in which no protection element 60A is disposed. The temperature measurement element 60B is provided in the light-emitting device 100 for the purpose of measuring the temperature of the light-emitting elements 20.

In the light-emitting device 100, in a top view, each interconnect 70 is bonded to a wiring region 14 of the package 10 on a side of a straight line (running parallel to the light-emitting surface 23 of the light-emitting element 20) that is on the light-emitting element 20 side (i.e., the side including the opposite surface of the light-emitting element 20 from the light-emitting surface 23). This makes it easier to avoid the presence of the interconnect 70 in the optical path of light.

In the light-emitting device 100, the package 10 is disposed on the second substrate 90. The lower face of the package 10 is mounted to the mounting surface of the second substrate 90, whereby the package 10 becomes supported by the second substrate 90. The lower face of the package 10 may also be the lower face of the first substrate 15.

Each of the light-emitting elements 20, the protection element(s) 60A, and the temperature measurement element 60B are electrically connected to the second substrate 90 via a wiring region 14, and may further be electrically connected to circuitry that is external to the light-emitting device 100 via multiple wiring regions of the second substrate 90.

In the light-emitting device 100, the second substrate 90 has a greater length along the second direction than a length along the first direction. The length of a shorter side of the second substrate 90, or length along the first direction, is ½ or less of the length of a longer side, or length along the second direction. As will be described in detail later, when the light-emitting device 100 is mounted in a head-mounted display 300 in a manner shown in FIG. 20, it is advantageous that the length along the first direction is shorter.

Hereinafter, the mounting surface 11M of the first substrate 15 and the mounting surface of the second substrate 90 may be distinguished as the first mounting surface 11M and the second mounting surface, respectively.

In the light-emitting device 100, the lens member 40 is disposed on the second substrate 90. The lens member 40 is mounted on the second mounting surface, whereby the lens member 40 becomes supported by the second substrate 90. Note that the lens member 40 may alternatively be mounted on the first substrate 15. By taking the illustrated example of the light-emitting device 100 for instance, the first substrate 15 may be made as large as the second substrate 90, such that the first substrate 15 extends over to where the lens member 40 is disposed, whereby the lens member 40 can be mounted on the first substrate 15.

The lens member 40 is disposed outside the package 10. Therefore, the lens member 40 is not surrounded by the lateral wall section 12. By not disposing the lens member 40 in the internal space of the package 10, the size of the package 10 along its height direction (i.e., the direction perpendicular to the mounting surface 11M) can be reduced, thus contributing to the downsizing of the light-emitting device 100.

The lens member 40 is struck by light which is emitted from the plurality of light-emitting elements 20 and emitted through the light extraction surface 10A to the outside of the package 10. All of the main portions of light emitted from the plurality of light-emitting elements 20 is incident on the lens member 40. Additionally, the portions of light emitted from the plurality of light-emitting elements 20 other than the main portions may also be incident on the lens member 40.

Light which is emitted from the plurality of light-emitting elements 20 and emitted from the light-transmissive region 13 to the outside of the package 10 is incident on the lens member 40, so as to be emitted through one lens surface thereof. The light from the plurality of light-emitting elements 20 having been incident on the incident surface of the lens member 40 becomes collimated light, and is emitted through the outgoing surface of the lens member 40. Collimating the light from the plurality of light-emitting elements 20 through one lens surface allows the intervals between the light-emitting elements 20 to be narrowed, thus contributing to the downsizing of the light-emitting device 100. Note that light from the plurality of light-emitting elements 20 may be allowed to be incident on a lens member having a plurality of lens surfaces.

The lower face of the lens member 40 is located below a plane containing the first mounting surface 11M. A part of the main portion of light emitted through the light extraction surface 10A, passes below the plane containing the first mounting surface 11M, at a position that is closer to the light extraction surface 10A than is the incident surface of the lens member. Bonding the package 10 and the lens member 40 to the second substrate 90 allows the lower face of the lens member 40 to be in a position that is lower than the mounting surface 11M, whereby light traveling at a lower position than the plane containing the mounting surface 11M is allowed to be incident on the lens member 40.

The optical axis of the lens surface of the lens member 40 through which light is emitted and the optical axis of light extracted through the light extraction surface 10A are at the same height from the mounting surface 11M of the base portion 11. The optical axis of the lens surface of the lens member 40 through which light is emitted is perpendicular to the second direction.

In the illustrated example of the light-emitting device 100, light which is emitted from the plurality of light-emitting elements 20 becomes collimated light that is collimated regarding its fast-axis direction (i.e., the direction perpendicular to the mounting surface 11M), and is emitted through the lens member 40. The lens member 40 includes one lens surface through which the first light G, the second light R, and the third light B are collimated. The optical axis of the first light G passes through the optical axis of the lens member 40.

In the light-emitting device 100, the optical control unit 50 is disposed on the second substrate 90. The optical control unit 50 is mounted on the second mounting surface, whereby the optical control unit 50 becomes supported by the second mounting surface. Note that the optical control unit 50 may alternatively be mounted on the first substrate 15.

Light emitted from the plurality of light-emitting elements 20 is incident on the optical control unit 50. Specifically, a plurality of rays of light having non-parallel optical axes to one another are incident on the optical control unit 50. The light which is incident on the optical control unit 50 has been collimated through the lens member 40.

The optical control unit 50 converts a plurality of rays of light whose optical axes are not parallel to one another and which are incident on the optical control unit 50, into a plurality of rays of light having parallel optical axes to one another, and emits them. As used herein, being parallel admits of a difference within ±3 degrees. The optical control unit 50 causes the optical axes of the incident plurality of rays of light to become coaxial, and emits them. From the optical control unit 50, the main portion of light that has been emitted from the plurality of light-emitting elements 20 is emitted.

The optical control unit 50 makes the optical axes of the plurality of rays of light parallel to the second direction, and emits them. As used herein, being parallel admits of a difference within ±3 degrees. Note that the optical axes of the plurality of rays of light emitted from the optical control unit 50 do not need to be parallel to the second direction. The plurality of rays of light emitted from the optical control unit 50 travel in a direction away from the package 10.

In a top view, the multiple optical control regions of the optical control unit 50 are inclined with respect to a straight line which is parallel to the second direction. Herein, as illustrated in FIG. 7, this angle of inclination is represented as θ. In FIG. 7, for simplicity, the angle of inclination θ is shown only with respect to the reflective surface 56M as a representative example. The angles of inclination θ of the multiple optical control regions may be set in a range of not less than 35° and not more than 70°, for example.

In a top view, the plurality of optical members of the optical control unit 50 are arranged in an oblique direction with respect to the second direction. In a top view, two adjacent optical members satisfy the following relationship: on an imaginary straight line which passes through the optical control region associated with one optical member, the other optical member does not exist; and that the one optical member does not exist on an imaginary line which passes through the optical control region associated with the other optical member. This relationship is satisfied by all of the optical members constituting the optical control regions. Arranging a plurality of optical members of similar shapes will facilitate the implementation.

In the illustrated example of the light-emitting device 100, the first light G, the second light R, and the third light B which have passed through one lens surface of the lens member 40 are incident on the optical control unit 50. The optical control unit 50 includes four optical members, and thus the first light G, the second light R, and the third light B, whose optical axes are parallel, are emitted from the optical control unit 50. The angles of inclination θ of all optical control regions are in the range of not less than 50° and not more than 75°. Making the angles of inclination θ greater than 45° provides an effect of reducing the size of the optical control unit 50 along the second direction or the 2D direction.

Although FIG. 3 illustrates an example where the first optical member 55 is composed of two first optical members 55a and 55b, these first optical members 55a and 55b facing each other via an interspace, the configuration of the optical control unit 50 is not limited to such an example. A transparent member may exist between the two first optical members 55a and 55b. For example, a transparent resin layer may be present. The two first optical members 55*a* and 55*b* may be bonded by a transparent member, so as to constitute one continuous part.

Now, based on the illustrated example of the light-emitting device 100, the mechanism by which the optical control unit 50 controls the first light G, the second light R, and the third light B will be described.

The optical control unit 50 to control three rays of light includes two first optical members 55*a* and 55*b*, the second optical member 56, and the third optical member 57. The first optical members 55 constitute at least four optical control regions. Herein, the four optical control regions are distinguished as the first region 51, the second region 52, the third region 53, and the fourth region 54.

The two first optical members 55*a* and 55*b* each have a first surface facing the lens member 40, and a second surface which is the opposite surface. The four optical control regions exist on the first surfaces and second surfaces of the two first optical members 55*a* and 55*b*.

The first region 51 and the second region 52 are provided on the respectively different first optical members 55*a* and 55*b*. The third region 53 and the fourth region 54 are provided on the respectively different first optical members 55*a* and 55*b*.

The first region 51 and the third region 53 are provided on different surfaces of the same first optical member 55*a*. The third region 53 is formed on the first surface of the first optical member 55*a*, whereas the first region 51 is formed on the second surface thereof. The second region 52 and the fourth region 54 are provided on different surfaces of the same first optical member 55*b*. The second region 52 is formed on the first surface of the first optical member 55*b*, whereas the fourth region 54 is formed on the second surface thereof.

The second optical member 56 includes a reflective surface 56M. The third optical member 57 includes a reflective surface 57M. The reflective surface 56M and the reflective surface 57M have a relative positioning such that they face each other via the two first optical members 55. The first optical members 55 are disposed between a plane that includes the reflective surface 56M of the second optical member 56 and a plane that includes the reflective surface 57M of the third optical member 57.

Figure 6A:
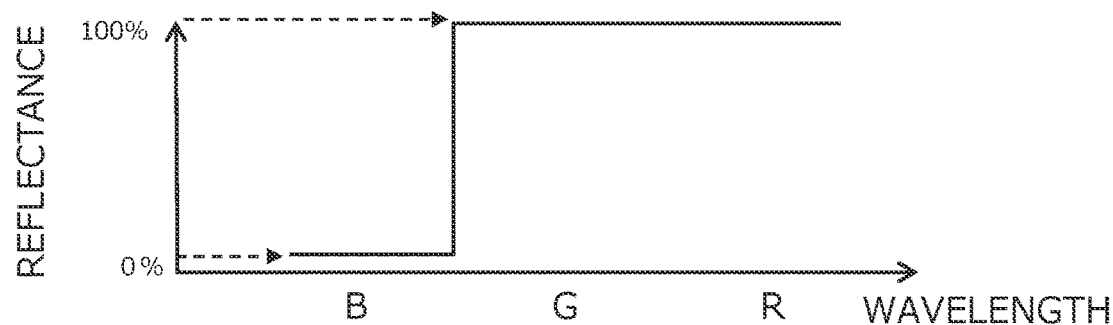
FIG. 6A is a graph showing an example of reflectance characteristics of a first region of an optical control unit according to the first embodiment.

FIG. 6A to FIG. 6D are schematic graphs for explaining reflectance/transmittance characteristics in the multiple optical control regions of the first optical member 55. The vertical axis represents reflectance, whereas the horizontal axis represents wavelength. The labels "B", "G", and "R" on the horizontal axis schematically indicate the central wavelengths of the wavelength regions in which blue, green, and red light are contained, respectively. For example, a dichroic mirror having reflectance/transmittance characteristics as shown in FIG. 6A reflects the first light G and the second light R with a reflectance near 100%, but reflects the third light B with a reflectance near 0%. Since absorption or other losses are negligible, the sum of transmittance and reflectance is 100% by approximation. Therefore, a dichroic mirror having such reflectance/transmittance characteristics can transmit the third light B with a transmittance near 100%.

In the present disclosure, to "reflect light" is synonymous with a reflectance of 50% or more at a peak wavelength of that light. On the other hand, to "transmit light" is synonymous with a reflectance or less than 50% at a peak wavelength of that light.

FIG. 6A shows an example of reflectance/transmittance characteristics to transmit the third light B and reflect the first light G and the second light R, and a dichroic mirror having such reflectance/transmittance characteristics can create the first region 51. The reflectance of the first region 51 is preferably 80% or more, and more preferably 90% or more, at the peak wavelength of the first light G. The reflectance of the first region 51 is preferably less than 20%, and more preferably less than 10%, at the peak wavelength of the third light B.

Figure 6B:
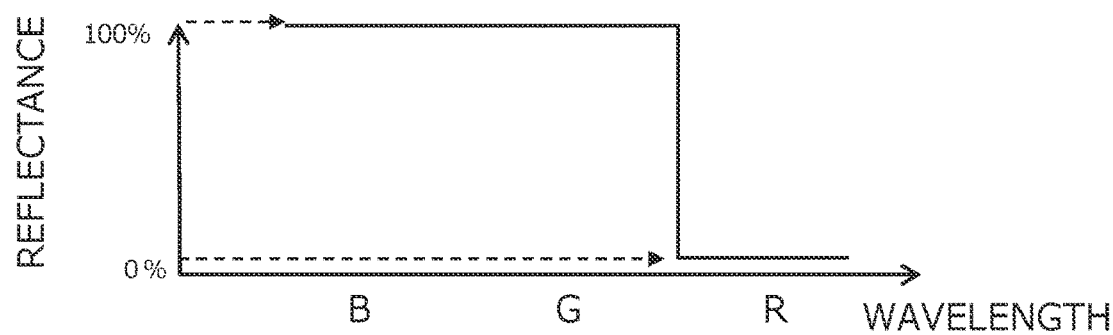
FIG. 6B is a graph showing an example of reflectance characteristics of a second region of an optical control unit according to the first embodiment.

FIG. 6B shows an example of reflectance/transmittance characteristics to transmit the second light R and reflect the first light G and the third light B, and a dichroic mirror having such reflectance/transmittance characteristics can create the second region 52. The reflectance of the second region 52 is preferably 80% or more, and more preferably 90% or more. The reflectance of the second region 52 is preferably less than 20%, and more preferably less than 10%, at the peak wavelength of the second light R.

Figure 6C:
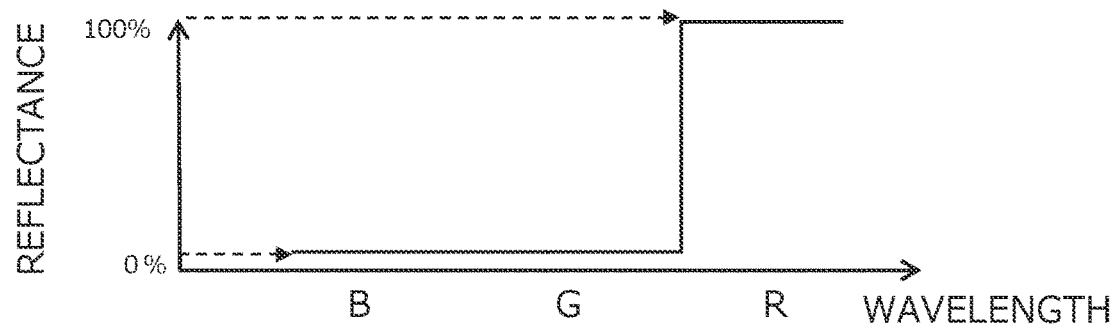
FIG. 6C is a graph showing an example of reflectance characteristics of a third region of an optical control unit according to the first embodiment.

FIG. 6C shows an example of reflectance/transmittance characteristics to transmit the first light G and the third light B and reflect the second light R, and a dichroic mirror having such reflectance/transmittance characteristics can create the third region 53. The reflectance of the third region 53 is preferably 80% or more, and more preferably 90% or more, at the peak wavelength of the second light R. The reflectance of the third region 53 is preferably less than 20%, and more preferably less than 10%, at the peak wavelength of the first light G. The reflectance of the third region 53 is preferably less than 20%, and more preferably less than 10%, at the peak wavelength of the third light B.

Figure 6D:
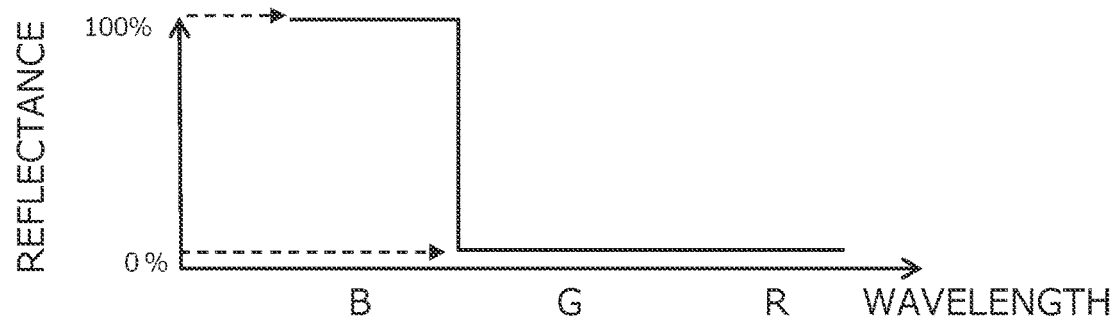
FIG. 6D is a graph showing an example of reflectance characteristics of a fourth region of an optical control unit according to the first embodiment.

FIG. 6D shows an example of reflectance/transmittance characteristics to transmit the first light G and the second light R and reflect the third light B, and a dichroic mirror having such reflectance/transmittance characteristics can create the fourth region 54. The reflectance of the fourth region 54 is preferably 80% or more, and more preferably 90% or more, at the peak wavelength of the third light B. The reflectance of the fourth region 54 is preferably less than 20%, and more preferably less than 10%, at the peak wavelength of the first light G. The reflectance of the fourth region 54 is preferably less than 20%, and more preferably less than 10%, at the peak wavelength of the second light R.

FIG. 7 schematically shows a manner in which the first region 51, the second region 52, the third region 53, the fourth region 54, the reflective surface 56M, and the reflective surface 57M transmit or reflect the first light G, the second light R, and the third light B.

The optical paths of the first light G, the second light R, and the third light B are as follows.

The first light G strikes the third region 53 of the optical control unit 50. The first light G is transmitted through the third region 53, and reflected by the first region 51. The first light G having been reflected by the first region 51 is reflected by the second region 52. After being reflected by the first region 51 and before being reflected by the second region 52, the first light G is transmitted through the third region 53. After being reflected by the first region 51 and before being reflected by the second region 52, the first light G is transmitted through the fourth region 54. The first light G having been reflected by the second region 52 is transmitted through the fourth region 54, and emitted from the optical control unit 50.

The second light R strikes the third region 53 of the optical control unit 50. The second light R is reflected by the third region 53. The second light R having been reflected by the third region 53 is reflected by the reflective surface 56M. After being reflected by the third region 53 and before being reflected by the reflective surface 56M, the second light R is transmitted through the fourth region 54. After being reflected by the third region 53 and before being reflected by the reflective surface 56M, the second light R is transmitted through the second region 52. The second light R having been reflected by the reflective surface 56M is transmitted through the fourth region 54, and emitted from the optical control unit 50. After being reflected by the reflective surface 56M and before being transmitted through the fourth region 54, the second light R is transmitted through the second region 52.

The third light B strikes the third region 53 of the optical control unit 50. The third light B is transmitted through the third region 53, and reflected by the reflective surface 57M. After being transmitted through the third region 53 and before being reflected by the reflective surface 57M, the third light B is transmitted through the first region 51. The third light B having been reflected by the reflective surface 57M is reflected by the fourth region 54, and emitted from the optical control unit 50. After being reflected by the reflective surface 57M and before being reflected by the fourth region 54, the third light B is transmitted through the first region 51. After being reflected by the reflective surface 57M and before being reflected by the fourth region 54, the third light B is transmitted through the third region 53.

In the optical control unit 50, the first light G passes through the third region 53 twice. The first light G passes through the fourth region 54 twice. The second light R passes through the second region 52 twice. The second light R passes through the fourth region 54 twice. The third light B passes through the first region 51 twice. The third light B passes through the third region 53 twice.

The optical control at the first region 51, the second region 52, the third region 53, the fourth region 54, the reflective surface 56M, and the reflective surface 57M is as follows.

The first region 51 reflects the first light G. Now, the optical path length of the first light G at the position where the first light G is reflected by the first region 51 is defined as the first optical path length. The first region 51 transmits the third light B. Since the second light R substantially does not enter the first region 51, no specific conditions for the reflectance/transmittance characteristics need to be defined for the second light R in the first region 51.

The second region 52 reflects the first light G. Now, the optical path length of the first light G at the position where the first light G is reflected by the second region 52 is defined as the second optical path length. The second region 52 reflects the first light G at the second optical path length, which is a longer optical path length than the first optical path length. The second region 52 transmits the second light R. Since the third light B substantially does not enter the second region 52, no specific conditions for the reflectance/transmittance characteristics need to be defined for third light R in the second region 52.

The third region 53 reflects the second light R. The third region 53 transmits the first light G. The third region 53 transmits the first light G at a shorter optical path length than the first optical path length. The third region 53 transmits the first light G at a longer optical path length than the first optical path length. The third region 53 transmits the third light B.

The fourth region 54 reflects the third light B. The fourth region 54 transmits the first light G. The fourth region 54 transmits the first light G at a longer optical path length than the first optical path length. The fourth region 54 transmits the first light G at a shorter optical path length than the second optical path length. The fourth region 54 transmits the first light G at a longer optical path length than the second optical path length. The fourth region 54 transmits the second light R.

The reflective surface 56M reflects the second light. The reflectance of the reflective surface 56M is preferably 80% or more, and more preferably 90% or more, at the peak wavelength of the second light R. The reflective surface 56M reflects the second light R having been reflected by the first optical member 55a. The reflective surface 56M reflects the second light R having been transmitted through the first optical member 55b. Since the first light G and the third light B substantially do not strike the reflective surface 56M, no specific conditions for the reflectance/transmittance characteristics need to be defined for the first light G and the third light B at the reflective surface 56M.

The reflective surface 57M reflects the third light. The reflectance of the reflective surface 57M is preferably 80% or more, and more preferably 90% or more, at the peak wavelength of the third light B. The reflective surface 57M reflects the third light B having been transmitted through the first optical member 55a. Since the first light G and the second light R substantially do not enter, no specific conditions for the reflectance/transmittance characteristics need to be defined for the first light G and the second light R at the reflective surface 57M.

With the optical control unit 50 of the illustrated example of the light-emitting device 100, the first optical member 55a divides the optical path between the first light G, the second light R, and the third light B, i.e., light that is reflected by the first surface of the first optical member 55a, light that is reflected by the second surface, and light that is transmitted through the first surface and the second surface.

The first light G, the second light R, and the third light B having been divided are made coaxial when being emitted from the first optical member 55b. Light that is reflected by the first surface of the first optical member 55b, light that is reflected by the second surface, and light that is transmitted through the first surface and the second surface are made coaxial.

In the optical control unit 50, optical control for the first light G is achieved by the first optical member 55. The second optical member 56 and the third optical member 57 do not need to be utilized for the optical control of the first light G. Optical control for the second light R is achieved by the first optical member 55 and the second optical member 56. The third optical member 57 does not need to be utilized for the optical control of the optical control of the second light R. Optical control for the third light B is achieved by the first optical member 55 and the third optical member 57. The second optical member 56 does not need to be utilized for the optical control of the optical control of the third light B.

The optical control unit 50 of such a configuration is implemented by adjusting the first optical member 55, the second optical member 56, and the third optical member 57 to be disposed in respectively appropriate positions. The positioning of the first optical member 55, the second optical member 56, and the third optical member 57 can be achieved by, after disposing the first optical members 55a and 55b, a step of disposing the second optical member 56 and the third optical member 57.

As described above, optical control for the first light G is achieved by the first optical member 55; therefore, first, by placing the first optical members 55a and 55b with their position and orientation adjusted, the outgoing direction of the first light G can be fixed. Thereafter, by adjusting the position and orientation of the second optical member 56, the outgoing direction of the second light R is fixed. Moreover, by adjusting the position and orientation of the reflective surface 57M of the third optical member 57, the outgoing direction of the third light B is fixed.

When light traveling on the optical axis of the first light G is emitted through the optical axis of the lens member 40 and incident on the optical control unit 50, the outgoing direction of the first light G can be fixed by disposing the first optical members 55a and 55b in parallel. Then, the second optical member 56 is placed with its position and orientation adjusted so that the outgoing direction of the second light R matches the outgoing direction of the first light G, and the third optical member 57 is placed with its position and orientation adjusted so that the outgoing direction of the third light B matches the outgoing direction of the first light G. Thus, the alignment of the three optical axes can be easily adjusted.

By providing a light-emitting unit that emits three rays of light having non-parallel optical axes, and then disposing the optical control unit 50 for the aforementioned optical control, a light-emitting device can be realized that emits three rays of light whose optical axes are parallel. Moreover, by disposing the plurality of optical members in the aforementioned manner, an optical control unit 50 that emits three rays of light whose optical axes are parallel can be realized.

The light-emitting unit can be provided through a step of disposing the package 10 including the light-emitting elements 20 and a step of disposing the lens member 40, for example. In terms of emitting three rays of light having non-parallel optical axes, however, the lens member 40 is not essential; for example, a light-emitting unit can also be provided by disposing three light-emitting elements 20.

Specifically, the light-emitting device 100 is produced by a method that involves disposing a first light-emitting element 20 to emit the first light G, a second light-emitting element 20 to emit the second light R, and a third light-emitting element 20 to emit the third light B, and disposing the optical control unit 50. At this time, disposing the optical control unit 50 involves: disposing the first optical members 55, which create the first region 51 that reflects the first light G at the first optical path length and transmits the third light B, the second region 52 that reflects the first light G at the second optical path length, which is a longer optical path length than the first optical path length, and transmits the second light R, the third region 53 that transmits the first light G and reflects the second light R, and the fourth region 54 that transmits the first light G and reflects the third light B; and, after disposing the first optical members 55, disposing the second optical member 56 having the reflective surface 56M to reflect the second light R and the third optical member 57 having a reflective surface 57M to reflect the third light B.

Note that the distance and angle between the first region 51 and the third region 53 can be adjusted based on the thickness and shape of the first optical member 55a. The distance and angle between the second region 52 and the fourth region 54 can be adjusted based on the thickness and shape of the first optical member 55b. Although the first region 51 and the third region 53 are parallel and the second region 52 and the fourth region 54 are parallel herein, such an example is not intended to limit the configuration of the present invention. In FIG. 3, for simplicity, refraction occurring in the light transmitted through the first optical members 55a and 55b is not depicted. When causing the optical axes of the first light G, the second light R, and the third light B to become parallel, and optionally coaxial, effects of refraction are preferably taken into consideration.

Next, based on the illustrated example of the light-emitting device 100, a mechanism by which two rays of light emitted from two light-emitting elements 20 are controlled will be described with reference to FIG. 8 and FIG. 9. FIG. 8 shows a mechanism of optical control for the first light G and the second light R, and FIG. 9 shows a mechanism of optical control for the first light G and the third light B.

In FIG. 8, for convenience, the first light G is depicted as first light 5A, the second light R as second light 5B, the first region 51 as a first region 1, the second region 52 as a second region 2, the third region 53 as a third region 3, and the reflective surface 56M of the second optical member 56 as a reflective surface M of the second optical member.

In FIG. 9, for convenience, the first light G is depicted as first light 5A, the third light B as second light 5B, the first region 51 as a first region 1, the second region 52 as a second region 2, the fourth region 54 as a third region 3, and the reflective surface 57M of the third optical member 57 as a reflective surface M of the second optical member.

Regarding FIG. 8 and FIG. 9, the optical paths of the first light 5A and the second light 5B and the optical control in each optical control region can be understood from the already-described "mechanism by which the first light G, the second light R, and the third light B are controlled"; therefore, any overlapping description may be omitted. In other words, the mechanism of optical control based on FIG. 8, can be understood by eliminating the aforementioned description concerning the third light B, the aforementioned description concerning the fourth region 54, and the aforementioned description concerning the reflective surface 57M of the third optical member 57. The mechanism of optical control based on FIG. 9 can be understood by eliminating the aforementioned description concerning the second light R, the aforementioned description concerning the third region 53, and the aforementioned description concerning the reflective surface 56M of the second optical member 56 from the aforementioned description. Evidently, these are easily understandable to those of ordinary skill in the art which to the present specification pertains to.

The following commonly applies to the optical controls in both of FIG. 8 and FIG. 9.

The first light 5A and second light 5B having non-parallel optical axes are incident on the optical control unit 50 become the first light 5A and second light 5B whose optical axes are parallel, and emitted from the optical control unit 50. The optical control unit 50 includes a first optical member 55 that constitutes three optical control regions. It also includes a second optical member having the reflective surface M. The optical control unit 50 includes one or two first optical members that creates or create: the first region 1 to reflect the first light 5A at the first optical path length; the second region 2 to reflect the first light 5A at the second optical path length, which is a longer optical path length than the first optical path length; and the third region 3 to transmit the first light 5A and reflect the second light 5B.

As for the method of manufacturing the light-emitting device 100, the light-emitting device 100 is manufactured by a method that involves: disposing a first light-emitting element 20 to emit the first light 5A, a second light-emitting element 20 to emit the second light 5B, and disposing the optical control unit 50. At this time, disposing the optical control unit 50 involves: disposing the first optical members 55, which create the first region 1 that reflects the first light 5A at the first optical path length, the second region 2 that reflects the first light 5A at the second optical path length, which is a longer optical path length than the first optical path length, and the third region 3 that transmits the first light 5A and reflects the second light 5B; and, after disposing the first optical members 55, disposing the second optical member having a reflective surface to reflect the second light 5B.

Thus, by arranging at least three regions and a reflective surface, and conferring different reflection/transmittance characteristics to the respective regions, within incident light, it is possible to coaxialize the optical axes of rays of light whose optical axes are oriented differently and which have different wavelengths, with the use of a small unit.

Second Embodiment

Figure 10:
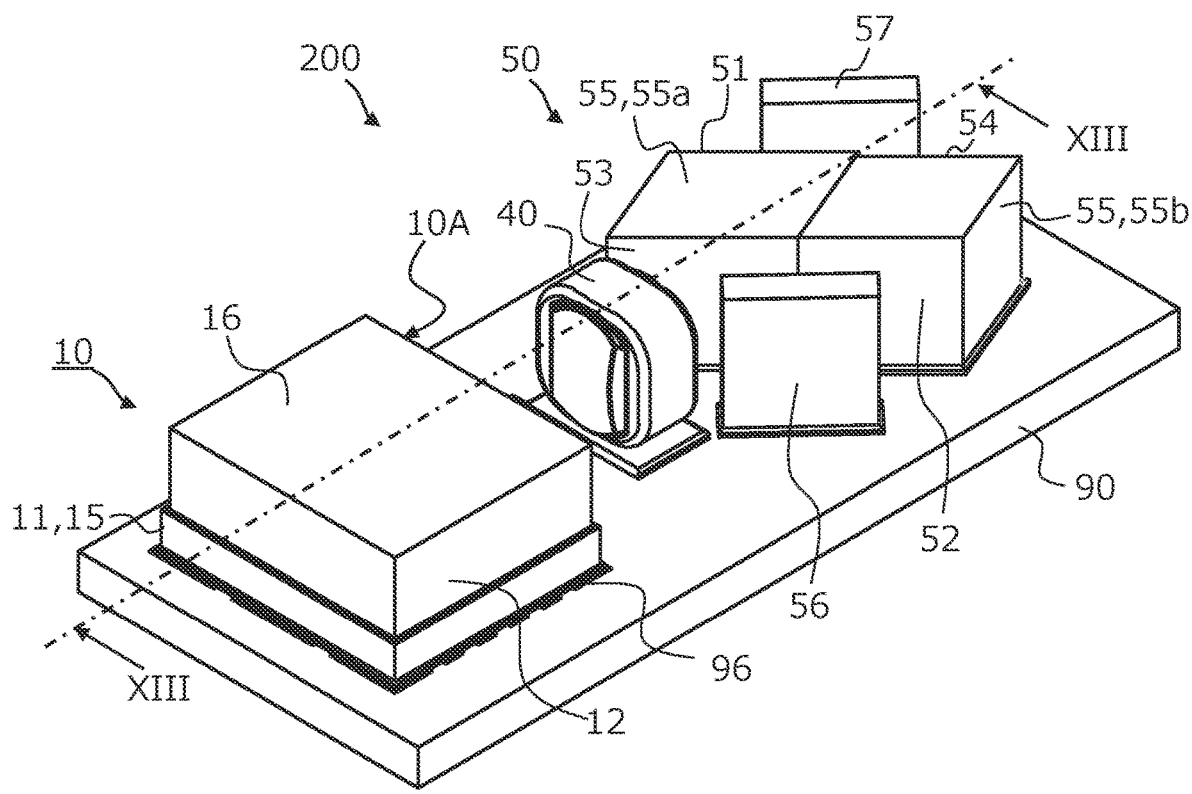
FIG. 10 is a perspective view of a light-emitting device according to a second embodiment.
Figure 11:
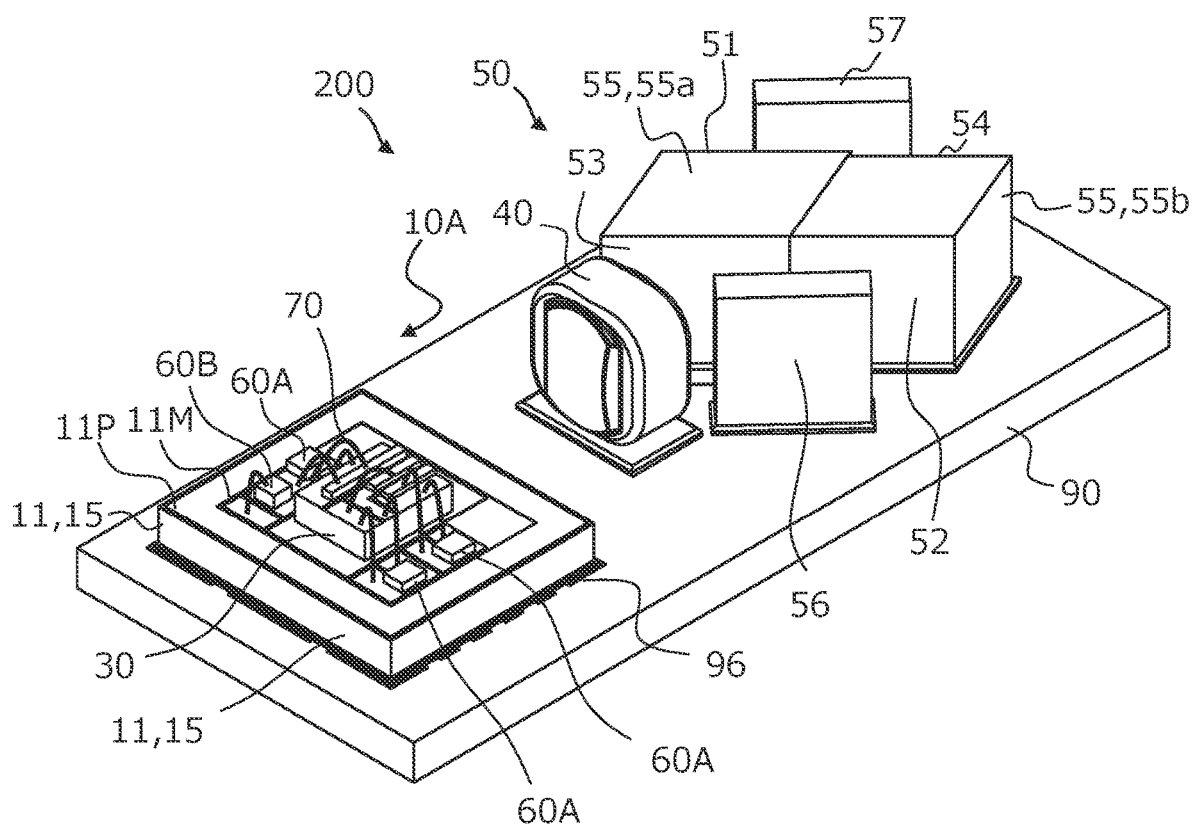
FIG. 11 is a perspective view of the light-emitting device according to the second embodiment, from which a cap of a package is omitted.
Figure 12:
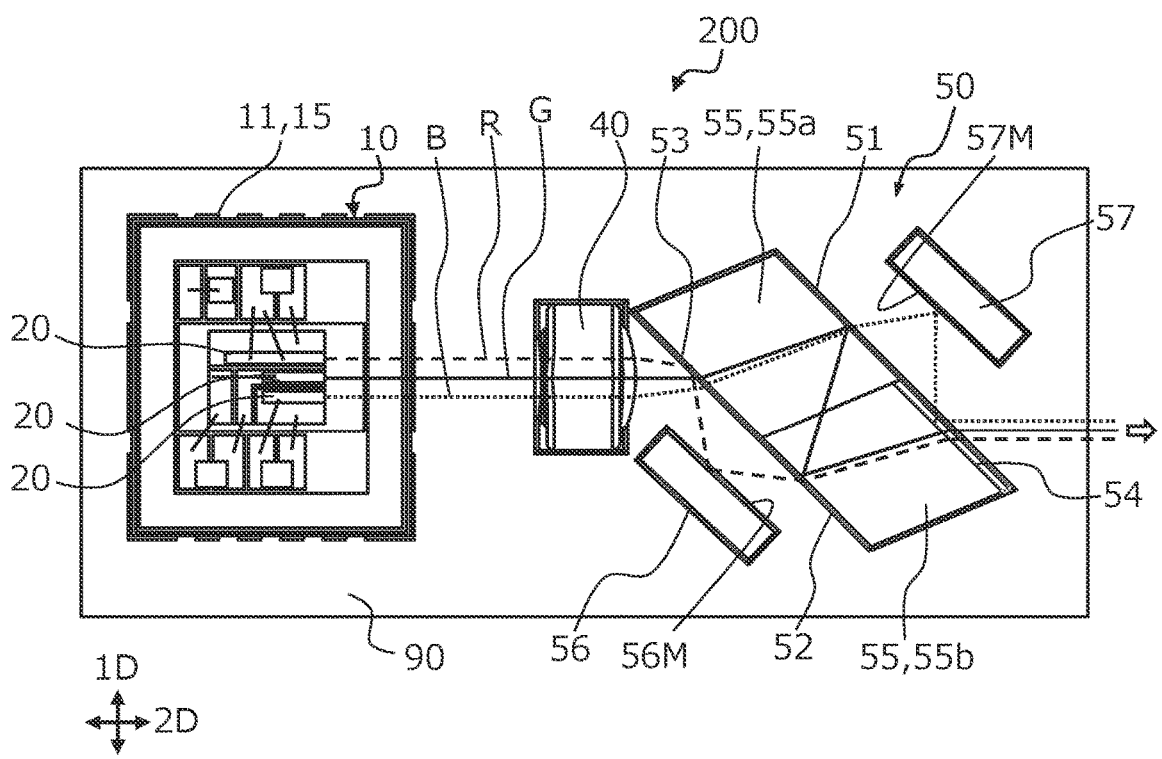
FIG. 12 is a perspective view of the light-emitting device according to the second embodiment, from which a cap of a package is omitted.
Figure 13:
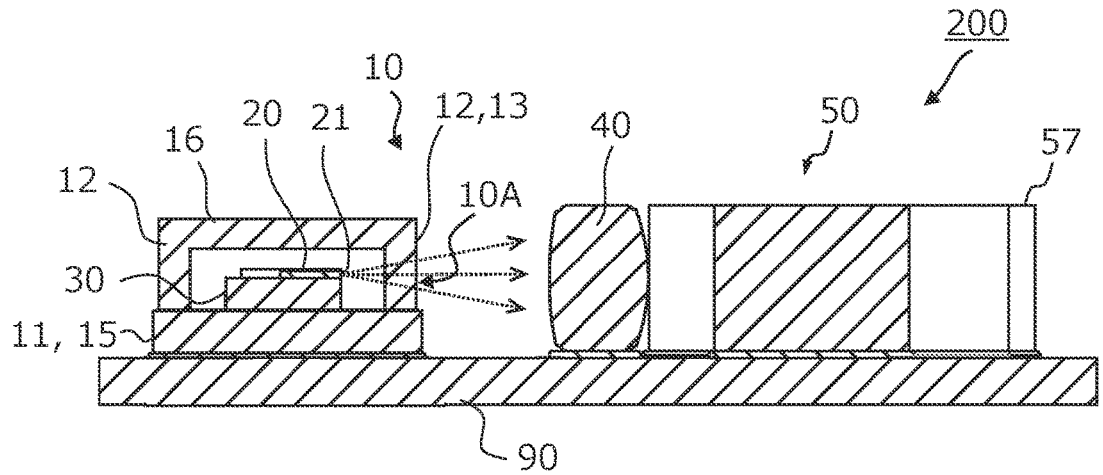
FIG. 13 is a cross-sectional view of the light-emitting device taken along cross-sectional line XIII-XIII in FIG. 10.
Figure 14:
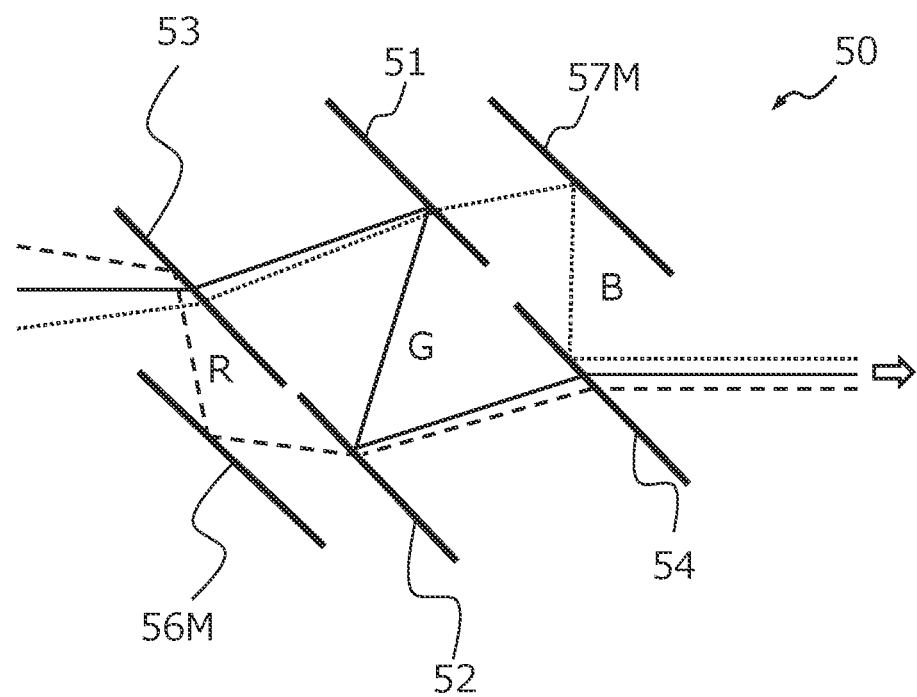
FIG. 14 is a diagram schematically showing transmission and reflection of light at reflective surfaces that are constituted by optical members of an optical control unit according to the second embodiment.

Next, a light-emitting device 200 according to a second embodiment will be described. FIG. 10 to FIG. 13 are diagrams for describing an illustrative implementation of the light-emitting device 200. FIG. 10 is a perspective view of the light-emitting device 200 according to the present embodiment. FIG. 11 is a perspective view of the light-emitting device 200 according to the second embodiment, from which a cap 16 of a package 10 is omitted. FIG. 12 is a top view illustrated similarly to FIG. 11. FIG. 13 is a cross-sectional view taken along cross-sectional line XIII-XIII in FIG. 10. FIG. 14 is a diagram schematically showing transmission and reflection of light at reflective surfaces that are constituted by optical members of an optical control unit 50 according to the second embodiment.

The light-emitting device 200 according to the present embodiment differs from the light-emitting device 100 according to the first embodiment mainly with respect to the configuration of the optical control unit 50. Therefore, those component elements which are common to the two embodiments will not be redundantly described here. Hereinafter, an exemplary configuration of the optical control unit 50 of the light-emitting device 200 will be described.

The optical control by the optical control unit 50 of the light-emitting device 200 is similarly implemented as in the optical control unit 50 of the light-emitting device 100. The optical control unit 50 is able to convert first light G, second light R, and third light B whose optical axes are not parallel into first light G, second light R, and third light B having parallel optical axes, and emit them. In FIG. 12, too, the optical axis of the first light G is depicted with a solid line; the optical axis of the second light R is depicted with a broken line; and the optical axis of the third light B is depicted with a dotted line.

Mainly, the shape and positioning of the two first optical members 55a and 55b of the optical control unit 50 of the light-emitting device 200 differ from those of the two first optical members 55a and 55b of the light-emitting device 100.

The first optical members 55a and 55b of the light-emitting device 200 are hexahedrons each having a parallelogram shape whose vertex angle are not 90 degrees in a top view. The two first optical members 55a and 55b are disposed so that they are opposed to each other at one of their four side faces. None of the first region 51, the second region 52, the third region 53, and the fourth region 54 is created on these two opposing side faces.

In the illustrated example of the light-emitting device 200, the two first optical members 55a and 55b are disposed so that their opposing side faces are in contact with each other. This allows the optical control unit 50 to be smaller in size. Also, this allows the size of the light-emitting device 200 along the first direction or the 1D direction to be smaller.

In order to ensure that no refractive index difference exists at the interface created by the side faces that are in contact with each other, the refractive index of the first optical member 55a and the refractive index of the other first optical member 55b are preferably equal or have close values. For example, their refractive index difference is preferably less than 0.5. This facilitates optical control when light is transmitted this interface.

Note that the first optical member 55 does not need to be composed of two first optical members 55a and 55b. The first optical member 55 may be composed of a single hexahedron. Moreover, an optical member that is formed by bonding together two first optical members 55a and 55b may be regarded as a single first optical member.

In a top view, the second region 52 and the fourth region 54 do not exist on an imaginary line connecting one of the two ends of the first region 51 that is closer to the fourth region 54 and one of the two ends of the third region 53 that is closer to the second region 52. In the light-emitting device 100, the second region 52 and the fourth region 54 exist on this imaginary line.

In a top view, the first region 51 and the third region 53 do not exist on an imaginary line connecting one of the two ends of the second region 52 that is closer to the third region 53 and one of the two ends of the fourth region 54 that is closer to the first region 51. In the light-emitting device 100, the first region 51 and the third region 53 exist on this imaginary line.

In a top view, an imaginary line connecting any point on the third region 53 and any point on the fourth region 54 passes through the two first optical members 55a and 55b. In the light-emitting device 100, this imaginary line does not pass through the two first optical members 55a and 55b.

In a top view, an imaginary line connecting any point on the first region 51 and any point on the second region 52 does not pass through the third region 53 and the fourth region 54. In the light-emitting device 100, this imaginary line passes through at least one of the third region 53 or the fourth region 54.

The optical paths of the first light G, the second light R, and the third light B differ from those in the light-emitting device 100 in the following respects.

After being reflected by the first region 51 and before being reflected by the second region 52, the first light G is not transmitted through the third region 53. After being reflected by the first region 51 and before being reflected by the second region 52, the first light G is not transmitted through the fourth region 54.

After being reflected by the third region 53 and before being reflected by the reflective surface 56M, the second light R is not transmitted through the fourth region 54. After being reflected by the third region 53 and before being reflected by the reflective surface 56M, the second light R is not transmitted through the second region 52.

After being reflected by the reflective surface 57M and before being reflected by the fourth region 54, the third light B is not transmitted through the first region 51. After being reflected by the reflective surface 57M and before being reflected by the fourth region 54, the third light B is not transmitted through the third region 53.

The first light G passes through the third region 53 once. The first light G passes through the fourth region 54 once. The second light R passes through the second region 52 once. The second light R passes through the fourth region 54 once. The third light B passes through the first region 51 once. The third light B passes through the third region 53 once.

Thus, as compared to the light-emitting device 100, each light passes through the optical control regions a smaller number of times. This allows for reducing loss of light in the optical control unit 50.

The optical controls in the first region 51, the second region 52, the third region 53, the fourth region 54, the reflective surface 56M, and the reflective surface 57M differ from those in the light-emitting device 100 in the following respects.

In the third region 53, the first light G is not transmitted at a longer optical path length than the first optical path length. In the fourth region 54, the first light G is not transmitted at a shorter optical path length than the second optical path length.

Figure 15:
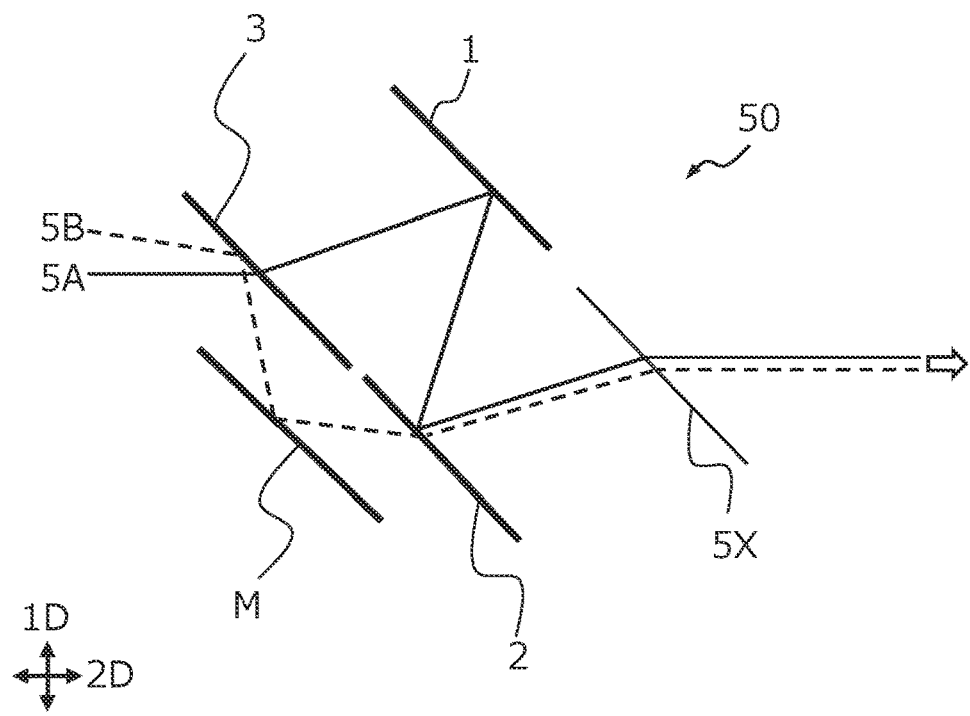
FIG. 15 is a diagram showing an example of transmission/reflection of first light and second light of different peak wavelengths in a modified example of an optical control unit according to the second embodiment.
Figure 16:
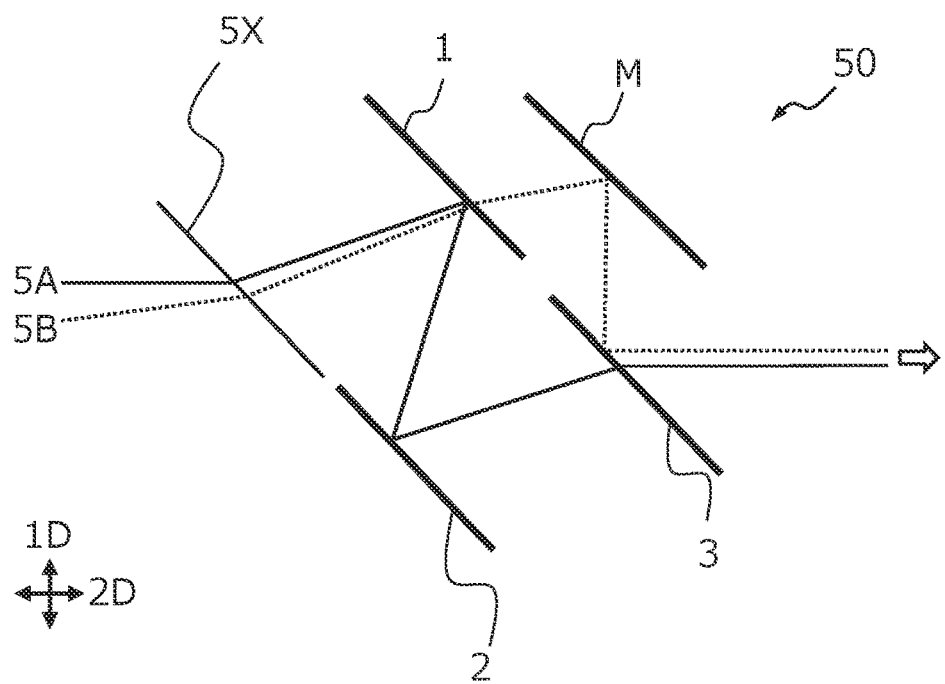
FIG. 16 is a diagram showing another example of transmission/reflection of first light and second light of different peak wavelengths in a modified example of an optical control unit according to the second embodiment.

FIG. 15 and FIG. 16 are diagrams of similar nature to FIG. 8 and FIG. 9 for the light-emitting device 100. FIG. 15 shows a mechanism of the optical control for the first light G and the second light R, and FIG. 16 shows a mechanism of the optical control for the first light G and the third light B.

In FIG. 15, for convenience, the first light G is depicted as first light 5A, the second light R as second light 5B, the first region 51 as a first region 1, the second region 52 as a second region 2, the third region 53 as a third region 3, and the reflective surface 56M of the second optical member 56 as a reflective surface M of the second optical member.

In FIG. 15, a face 5X is depicted that corresponds to the fourth region 54 in the illustrated example of the light-emitting device 200, such that the first light 5A and second light 5B emitted from the face 5X are parallel. However, the face 5X is not essential because it would also be possible to make the optical axes of the first light 5A and second light 5B parallel just as they are emitted from the second region 2, before even reaching the face 5X.

In FIG. 16, for convenience, the first light G is depicted as first light 5A, the third light B as second light 5B, the first region 51 as a first region 1, the second region 52 as a second region 2, the fourth region 54 as a third region 3, and the reflective surface 57M of the third optical member 57 as a reflective surface M of the second optical member.

FIG. 16 depicts a face 5X that corresponds to the third region 53 in the illustrated example of the light-emitting device 200. However, the face 5X is not essential because this is before the first light 5A and the second light 5B become split.

Regarding FIG. 15 and FIG. 16, the optical paths of the first light 5A and the second light 5B and the optical control in each optical control region can be understood from the already-described "mechanism by which the first light G, the second light R, and the third light B are controlled"; therefore, any overlapping description may be omitted.

Also regarding FIG. 15 and FIG. 16, what commonly applies to the optical controls in both of FIG. 8 and FIG. 9 similarly applies.

Modified Examples of Embodiments

Figure 17:
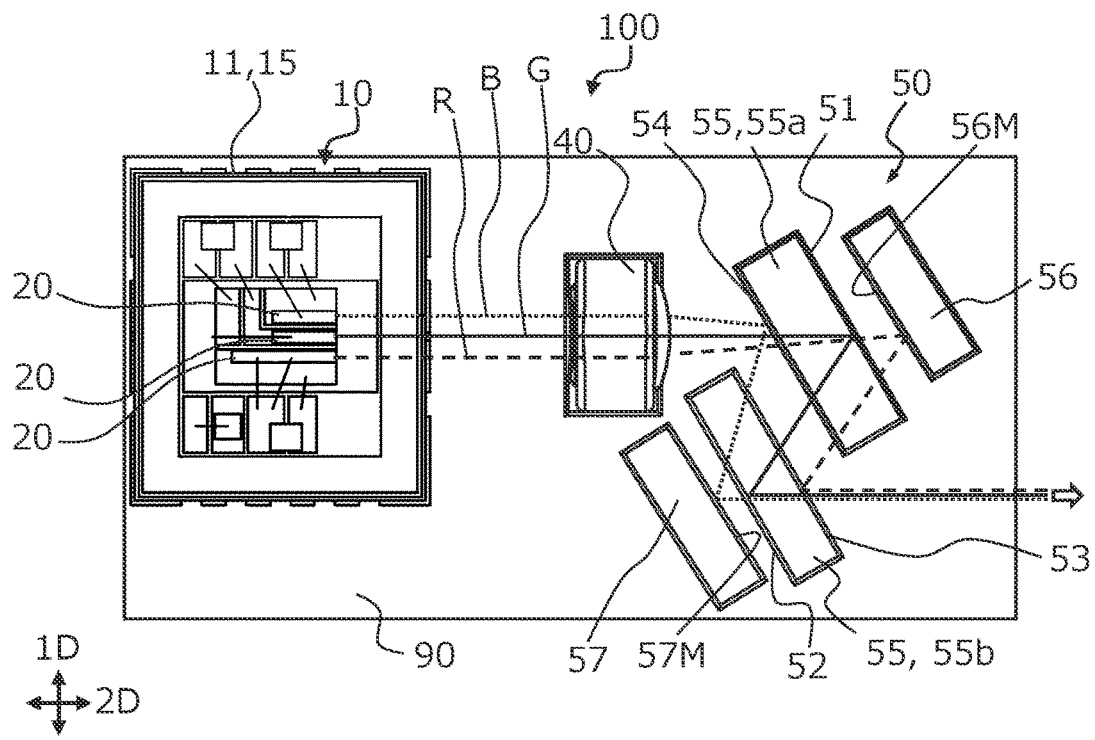
FIG. 17 is a top view of a modified example of the light-emitting device according to the first embodiment, from which a cap of a package is omitted.

FIG. 17 is a top view of a modified example of the light-emitting device 100 according to the first embodiment, from which the cap of the package is omitted.

The light-emitting device 100 shown in FIG. 17 differs from the light-emitting device 100 according to the first embodiment shown in FIG. 3 with respect to the arrangement of the light-emitting elements 20 inside the package 10 and the configuration of the optical control unit 50.

In the example of FIG. 17, each of the first light G, the second light R, and the third light B, after being transmitted and collimated through the lens member 40, is incident on the fourth region 54 of the first optical member 55a of the optical control unit 50. As has been described with respect to the first embodiment, the fourth region 54 transmits the first light G and the second light R, and reflects the third light B. In the first embodiment, the fourth region 54 is a region on which the first light G is incident at a longer optical path length than the second optical path length, and the first light G, the second light R, and the third light B are emitted from the fourth region 54 as such. On the other hand, in the example of FIG. 17, the fourth region 54 is a region on which the first light G is incident at a shorter optical path length than the first optical path length, and the first light G, the second light R, and the third light B are incident on the fourth region 54 as such.

On the other hand, in the example of FIG. 17, the third region 53 transmits the first light G and the third light B, and reflects the second light R. Moreover, the third region 53 is a region on which the first light G is incident at a longer optical path length than the second optical path length, and the first light G, the second light R, and the third light B are emitted from the third region 53 as such.

Thus, the third region 53 and the fourth region 54 can be disposed so as to each function as one of the light-incident surface and the light-emitting surface of the optical control unit 50. In the example of FIG. 17, the positions of the second optical member 56 and the third optical member 57 are reversed from the first embodiment. Because the reflective surface 56M of the second optical member 56 and the reflective surface 57M of the third optical member 57 do not need to have wavelength selectivity, their positions do not need to be reversed according to the wavelength of the incident light.

Thus, with the configuration illustrated in FIG. 17, too, similar effects to those of the light-emitting device 100 according to the first embodiment can be obtained.

Figure 18:
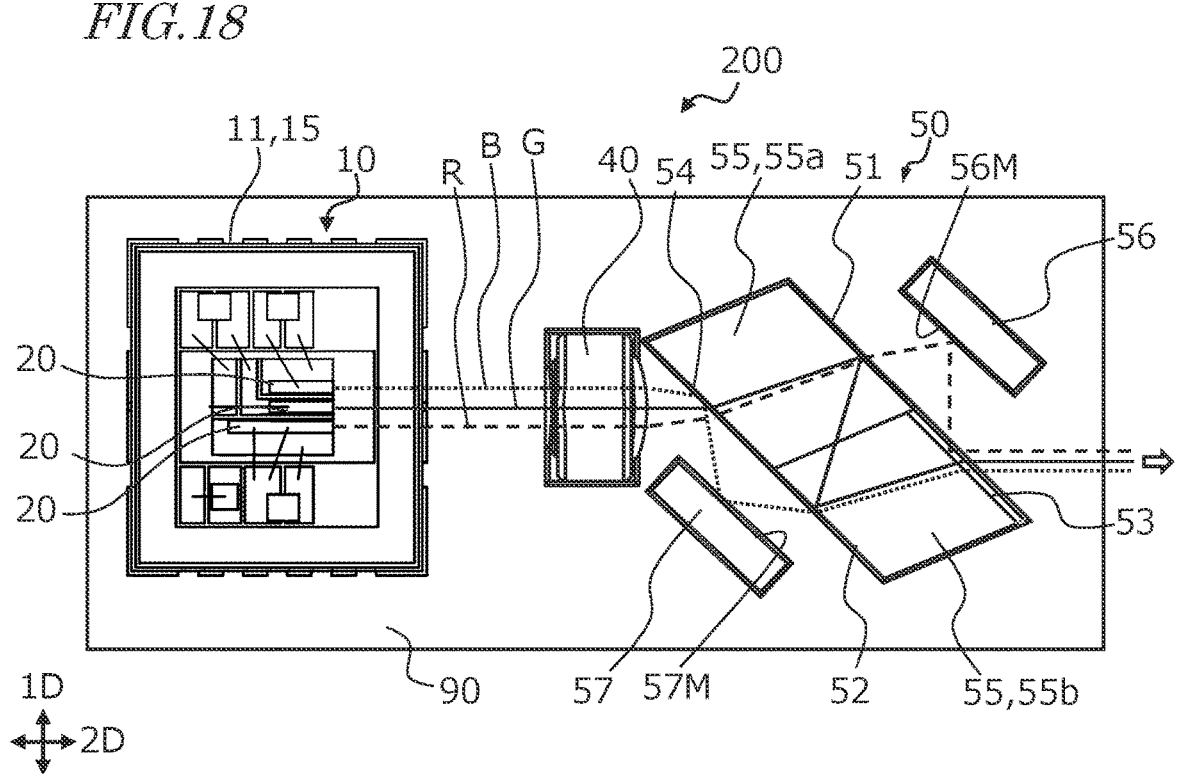
FIG. 18 is a top view of a modified example of the light-emitting device according to the second embodiment, from which a cap of a package is omitted.

FIG. 18 is a top view of a modified example of the light-emitting device according to the second embodiment, from which a cap of a package is omitted.

The light-emitting device 200 shown in FIG. 18 differs from the light-emitting device 200 according to the second embodiment shown in FIG. 12 with respect to the arrangement of the light-emitting elements 20 inside the package 10 and the configuration of the optical control unit 50.

In the example of FIG. 18, each of the first light G, the second light R, and the third light B, after being transmitted and collimated through the lens member 40, is incident on the fourth region 54 of the first optical member 55a of the optical control unit 50. The fourth region 54 transmits the first light G and the second light R, and reflects the third light B.

On the other hand, the third region 53 transmits the first light G and the third light B, and reflects the second light R. The third region 53 is a region on which the first light G is incident at a longer optical path length than the second optical path length, and the first light G, the second light R, and the third light B are emitted from the third region 53 as such.

Thus, with the exemplary configuration illustrated in FIG. 18, too, similar effects to those of the light-emitting device 200 according to the second embodiment can be obtained.

In accordance with the embodiments and their modified examples described above, light which is incident on the light-incident surface (e.g., one of the third region 53 and the fourth region 54) of the optical control unit 50 in such a state that their optical axes are not parallel can be emitted from the light-emitting surface (e.g., the other one of the third region 53 and the fourth region 54) of the optical control unit 50 in such a state that their optical axes are parallel to one another. Moreover, the interval between the optical axes of rays of light incident on the light-incident surface is made smaller when rays of light are emitted from the light-emitting surface.

Figure 19A:
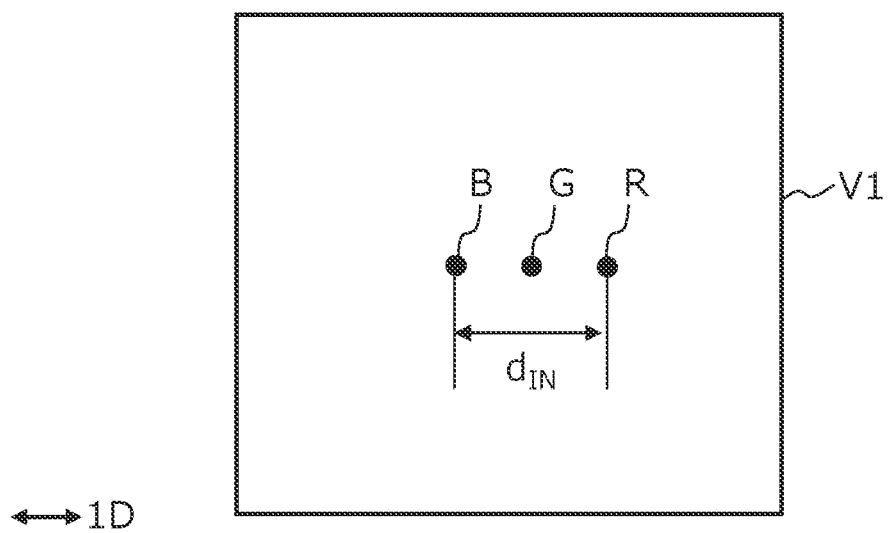
FIG. 19A is a diagram schematically showing the positions of the optical axes of rays of light that are incident on a light-incident surface of an optical control unit 50.

FIG. 19A is a diagram schematically showing the positions of the optical axes of rays of light that are incident on the light-incident surface of the optical control unit 50. More specifically, FIG. 19A is a diagram schematically showing a point where the light traveling on an optical axis of each of the first light G, the second light R, and the third light B strikes the region (one of the third region 53 and the fourth region 54) on which the first light G is incident at a shorter optical path length than the first optical path length, these points being projected onto an imaginary plane V1 that is perpendicular to the second direction (2D). Herein, the distance between two most distant points on this imaginary plane V1 is defined as the first distance ($d_{IN}$).

Figure 19B:
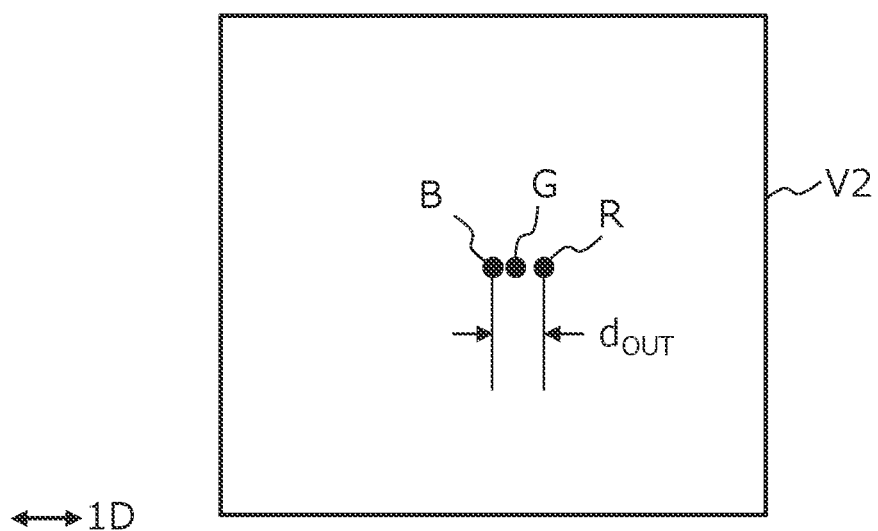
FIG. 19B is a diagram schematically showing the positions of the optical axes of rays of light that are emitted from a light-emitting surface of the optical control unit 50.

FIG. 19B is a diagram schematically showing the positions of the optical axes of rays of light that are emitted from the light-emitting surface of the optical control unit 50. More specifically, FIG. 19B is a diagram schematically showing a point where the light traveling on an optical axis of each of the first light G, the second light R, and the third light B strikes the region (the other one of the third region 53 and the fourth region 54) on which the first light G is incident at a longer optical path length than the second optical path length, these points being projected onto another imaginary plane V2 that is perpendicular to the second direction (2D). Herein, the distance between two most distant points on this imaginary plane V2 is defined as the second distance ($d_{OUT}$).

According to an embodiment of the present disclosure and a modified example thereof, the second distance ($d_{OUT}$) can be made smaller than the first distance ($d_{IN}$). When the first distance ($d_{IN}$) is in the range of e.g. not less than 50 μm and not more than 1000 μm, the second distance ($d_{OUT}$) may be in the range of not less than 0 μm and not more than 100 μm. When the second distance ($d_{OUT}$) is in the range of not more than 100 μm, it can be said that the first light, the second light, and the third light are "coaxial". The "main portion" of each of the first light, the second light, and the third light that has been collimated by the lens member 40 may have the general shape of an ellipse or circle on the imaginary plane V1 or V2, for example. When the main portion of the first light, the second light, and the third light has the shape of an ellipse on the imaginary plane V1 or V2, the major axis of each ellipse may be in the range of e.g., not less than 500 μm and not more than 5000 μm, and its minor axis may be in the range of e.g. not less than 200 μm and not more than 2000 μm. The degree of overlapping between the main portions of the first light, second light, and the third on the imaginary plane V2 is greater than the degree of overlapping between the main portions of the first light, second light, and the third on the imaginary plane V1.

Figure 20:
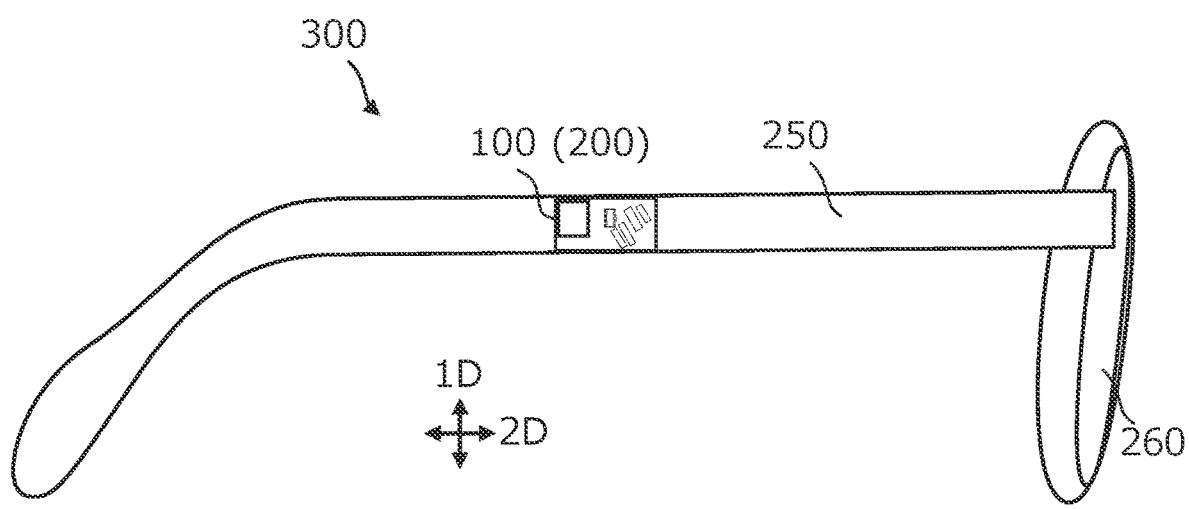
FIG. 20 is a schematic side view of a head-mounted display that includes a light-emitting device according to an embodiment of the present disclosure.

FIG. 20 is a side view schematically showing an exemplary configuration of a head-mounted display 300 that includes a light-emitting device 100 (200) according to an embodiment of the present disclosure. The head-mounted display 300 includes a temple 250, and a waveguide 260 connected to the temple 250. The waveguide 260 includes a light-emitting region such as a diffraction grating. Laser light which is incident on the waveguide 260 may be emitted through the light-emitting region of the waveguide 260 toward the retina of an eye of a user.

One end of the temple 250 is located on the waveguide 260 side, i.e., closer to the face of the user, while the other end of the temple 250 is located on the opposite side to the waveguide 260, i.e., closer to an ear of the user. In FIG. 20, the direction along these ends of the temple 250 is denoted as the 2D direction, and a direction perpendicular thereto is denoted as the 1D direction. On the basis of the user wearing the head-mounted display 300, the 1D direction is the direction from the chin to the head of the user (or the opposite direction thereto), whereas the 2D direction is the direction from the ear to the eye of the user (or the opposite direction thereto).

In the exemplary head-mounted display 300 shown in FIG. 20, the light-emitting device 100 (200) is supported on the inside of the temple 250. Although FIG. 20 illustrates the light-emitting device 100 (200) as if appearing on the side shown, the actual appearance of the light-emitting device 100 (200) is obscured from the outside. The size of the light-emitting device 100 (200) along a direction that is parallel to the first direction or the 1D direction may be e.g. not less than 3 mm and not more than 15 mm, that is, smaller than the size of the temple 250 along the 1D direction.

Preferably, the light-emitting device 100 (200) is mounted on the head-mounted display 300 in such a manner that the first direction or the 1D direction of the light-emitting device 100 (200) and the 1D direction of the head-mounted display 300 are identical, and that the second direction or the 2D direction of the light-emitting device 100 (200) and the 2D direction of the head-mounted display 300 are identical. Because of the light-emitting device 100 (200) being downsized along the 1D direction, the size of the temple 250 along the 1D direction can be reduced. As shown in the figure, the temple 250 has a length along the 2D direction that sufficiently covers the distance from the eye to the ear of the user; therefore, so long as the size of the light-emitting device 100 (200) along the 2D direction is somewhat small, any further reduction will not contribute to the downsizing of the head-mounted display 300 along the 2D direction.

In this embodiment, collimated beams of the first light, the second light, and the third light can be emitted in a coaxial manner in the second direction (2D). The first light, the second light, and the third light may be laser beams of any of red, green, and blue colors. The laser beam of each color is used for a MEMS device (e.g., a micromirror) for scanning, so as to travel within the waveguide 260 and eventually form an image on the retina of the user. Displaying of a color image may be performed by a field sequential method. In that case, the first light, the second light, and the third light are to be emitted in a sequential manner. In order to monitor the intensities of the first light, the second light, and the third light, a photodetector such as a photodiode may be utilized for each color of light. The photodetectors may be disposed on the outside or on the inside of the light-emitting device 100 (200). The photodetectors may be disposed inside the package 10 of the light-emitting device 100 (200).

Under a method where an image is to be formed on the retina, the beam convergence spot on the retina is preferably as small as possible, for achieving a high resolution. From this standpoint, a longer focal length is preferable. On the other hand, a longer focal length may result in less light being incident on the lens surface of the lens member 40, thus causing an increased loss of light. In the case of laser light, there is a wider spread of light along the fast-axis direction than along the slow-axis direction; therefore, the fast-axis direction is more susceptible to such losses.

Moreover, in a near-field pattern, the shape of the laser light will be larger along the slow-axis direction than along the fast-axis direction of the FFP. Therefore, if a lens having an identical focal length along both the slow axis and the fast axis is used for collimation, the convergence spot on the retina will be larger along the slow-axis direction.

Therefore, the lens surface of the lens member 40 is preferably designed so that the focal length along the slow-axis direction is longer than the focal length along the fast-axis direction. This will allow the size of the convergence spot along the slow-axis direction to be reduced without inducing an increased loss of laser light.

Although embodiments of the present invention have been described above, light-emitting devicees according to the present invention are not to be strictly limited to the light-emitting devicees of the embodiments. In other words, the present invention can be carried out without being limited to the outer shapes and structures of the light-emitting devicees disclosed in the embodiments. For example, the light-emitting device may lack the protection elements. The present invention is applicable without requiring all of the component elements. For example, when a claim does not recite some of the component elements of a light-emitting device according to an embodiment, it is intended that such component elements permit design choices by one skilled in the art (e.g., replacement, omission, changes in shape, changes in material) and that the invention defined by the claim is still applicable.

INDUSTRIAL APPLICABILITY

Light-emitting devices according to embodiments can be used for head-mounted displays, projectors, illuminations, displays, and the like.

REFERENCE SIGNS LIST

1 first region
2 second region
3 third region
10 package
10A light extraction surface
11 base portion
11M mounting surface
11P peripheral region
12 lateral wall section
13 light-transmissive region
14 wiring region
15 substrate (first substrate)
16 cap
17 metal layer
20 light-emitting element
30 submount
40 lens member
50 optical control unit
51 first region
52 second region
53 third region
54 fourth region
55 first optical member
55a first optical member
55b first optical member
56 second optical member
57 third optical member
60A protection element
60B temperature measurement element
70 interconnect
90 substrate (second substrate)
100 light-emitting device (first embodiment)
200 light-emitting device (second embodiment)
300 head-mounted display

The invention claimed is:

1. A light-emitting device comprising:
a first light-emitting element to emit first light having a first peak wavelength;
a second light-emitting element to emit second light having a second peak wavelength which is different from the first peak wavelength;
a third light-emitting element to emit third light having a third peak wavelength which is different from the first peak wavelength and the second peak wavelength; and
an optical control unit to receive the first light and second light having non-parallel optical axes and emit the first light and second light such that the first light and second light have parallel optical axes, wherein:
the optical control unit includes:
one or two first optical members which create a first region to reflect the first light at a first optical path length, a second region to reflect the first light at a second optical path length which is a longer optical path length than the first optical path length, and a third region to transmit the first light and reflect the second light,
a second optical member having a reflective surface to reflect the second light, and
a third optical member having a reflective surface to reflect the third light;
the one or two first optical members further create a fourth region to transmit the first light and second light and reflect the third light; and
the optical control unit receives the first light, second light, and third light having non-parallel optical axes, and emits the first light, second light, and third light such that the first light, second light, and third light have parallel optical axes.

2. The light-emitting device of claim 1, wherein the reflective surface of the second optical member reflects the second light having been transmitted through the one or two first optical members or having been reflected by the one or two first optical members.

3. The light-emitting device of claim 1, wherein:
the third region transmits the first light at a shorter optical path length than the first optical path length; and
the second region reflects the first light and transmits the second light.

4. The light-emitting device of claim 3, wherein:
the reflective surface of the second optical member reflects the second light having been reflected by the third region; and
the second light passes through the second region twice.

5. The light-emitting device of claim 3, wherein:
the reflective surface of the second optical member reflects the second light having been reflected by the third region; and
the second light passes through the second region once.

6. The light-emitting device of claim 1, wherein:
the third region transmits the first light at a longer optical path length than the second optical path length; and
the first region reflects the first light and transmits the second light.

7. The light-emitting device of claim 6, wherein:
the third region reflects the second light having been reflected by the reflective surface of the second optical member; and
the second light passes through the first region twice.

8. The light-emitting device of claim 6, wherein:
the third region reflects the second light having been reflected by the reflective surface of the second optical member; and
the second light passes through the first region once.

9. The light-emitting device of claim 1, comprising two said first optical members, wherein:
the first region and the second region are provided on respectively different first optical members among the two said first optical members; and
the third region and the fourth region are provided on respectively different first optical members among the two said first optical members.

10. The light-emitting device of claim 1, wherein the one or two first optical members are disposed between a plane containing the reflective surface of the second optical member and a plane containing the reflective surface of the third optical member.

11. The light-emitting device of claim 1, wherein the third light passes through the first region as many times as the second light passes through the second region.

12. The light-emitting device of claim 1, wherein the first light, the second light, and the third light are light of respectively different colors selected from among red light, green light, and blue light, respectively.

13. The light-emitting device of claim 1, wherein the first light-emitting element, second light-emitting element, and third light-emitting element are semiconductor laser devices.

14. The light-emitting device of claim 1, wherein:
the first light, second light, and third light are incident on one of the third region or the fourth region on which the first light is incident at a shorter optical path length than the first optical path length;
the first light, second light, and third light are emitted from one of the third region or the fourth region on which the first light is incident at a longer optical path length than the second optical path length; and,
regarding a point where light traveling on an optical axis of each of the first light, second light, and third light strikes the one region on which the first light is incident at a shorter optical path length than the first optical path length, a distance between two most distant ones of the points is defined as a first distance; regarding a point where light traveling on an optical axis of each of the first light, second light, and third light strikes the one region on which the first light is incident at a longer optical path length than the second optical path length, a distance between two most distant ones of the points is defined as a second distance; and the second distance is shorter than the first distance.

15. The light-emitting device of claim 1, further comprising:
a lens member having one lens surface to collimate the first light having been emitted from the first light-emitting element, the second light having been emitted from the second light-emitting element, and the third light having been emitted from the third light-emitting element, wherein:
the first light, second light, and third light having passed through the one lens surface of the lens member are incident on the optical control unit.

16. A method of manufacturing a light-emitting device, the method comprising:
disposing a first light-emitting element to emit first light having a first peak wavelength and a second light-emitting element to emit second light having a second peak wavelength which is different from the first peak wavelength, and a third light-emitting element to emit third light having a third peak wavelength which is different from the first peak wavelength and the second peak wavelength; and
disposing an optical control unit to receive the first light and second light having non-parallel optical axes and emit the first light and second light such that the first light and second light have parallel optical axes, wherein:
disposing the optical control unit comprises:
disposing one or two first optical members which create a first region to reflect the first light at a first optical path length, a second region to reflect the first light at a second optical path length which is a longer optical path length than the first optical path length, and a third region to transmit the first light and reflect the second light, and
after disposing the first optical member, disposing a second optical member having a reflective surface to reflect the second light and disposing a third optical member having a reflective surface to reflect the third light; wherein:
the one or two first optical members further create a fourth region to transmit the first light and second light and reflect the third light; and
the optical control unit receives the first light, second light, and third light having non-parallel optical axes, and emits the first light, second light, and third light such that the first light, second light, and third light have parallel optical axes.

17. A light-emitting device comprising:
a first light-emitting element to emit first light having a first peak wavelength;
a second light-emitting element to emit second light having a second peak wavelength which is different from the first peak wavelength; and
an optical control unit to receive the first light and second light having non-parallel optical axes and emit the first light and second light such that the first light and second light have parallel optical axes, wherein:
the optical control unit includes:
one or two first optical members which create a first region to reflect the first light at a first optical path length, a second region to reflect the first light at a second optical path length which is a longer optical path length than the first optical path length, and a third region to transmit the first light and reflect the second light, and
a second optical member having a reflective surface to reflect the second light;
the third region transmits the first light at a shorter optical path length than the first optical path length; and
the second region reflects the first light and transmits the second light.

18. The light-emitting device of claim 17, wherein:
the reflective surface of the second optical member reflects the second light having been reflected by the third region; and
the second light passes through the second region twice.

19. The light-emitting device of claim 17, wherein:
the reflective surface of the second optical member reflects the second light having been reflected by the third region; and
the second light passes through the second region once.

* * * * *